United States Patent [19]
Emori et al.

[11] Patent Number: 5,933,252
[45] Date of Patent: Aug. 3, 1999

[54] COLOR IMAGE PROCESSING METHOD AND APPARATUS THEREFOR

[75] Inventors: Yasufumi Emori, Tokyo; Kazuhiko Onuma; Tadataka Koga, both of Chiba; Yoshizumi Yasuda, Kashiwa; Yoshinobu Mita, Kawasaki; Osamu Yamada, Tokyo, all of Japan

[73] Assignee: Canon Kabushiki Kaisha, Tokyo, Japan

[21] Appl. No.: 08/370,354

[22] Filed: Jan. 9, 1995

Related U.S. Application Data

[63] Continuation of application No. 07/785,097, Oct. 30, 1991, abandoned.

[30] Foreign Application Priority Data

| Nov. 21, 1990 | [JP] | Japan | 2-314217 |
| Nov. 21, 1990 | [JP] | Japan | 2-314219 |
| Jan. 14, 1991 | [JP] | Japan | 3-002842 |
| Mar. 20, 1991 | [JP] | Japan | 3-056858 |

[51] Int. Cl.$^6$ ...................................... H04N 1/46
[52] U.S. Cl. .................. 358/500; 358/518; 358/520; 358/523
[58] Field of Search ............... 358/500, 501, 358/518, 520, 523, 524, 448; 348/649, 645

[56] References Cited

U.S. PATENT DOCUMENTS

| 4,667,228 | 5/1987 | Kawamura et al. ............ 358/80 |
| 4,731,662 | 3/1988 | Udagawa et al. ............. 358/75 |
| 4,758,885 | 7/1988 | Sasaki et al. .............. 358/80 |
| 4,805,013 | 2/1989 | Dei et al. ................ 358/80 |
| 4,941,038 | 7/1990 | Walowit .................. 358/518 |
| 5,060,060 | 10/1991 | Udagawa et al. ............ 358/80 |
| 5,060,280 | 10/1991 | Mita et al. ............... 382/33 |
| 5,185,661 | 2/1993 | Ng ....................... 358/75 |
| 5,243,414 | 9/1993 | Dalrymple et al. .......... 358/518 |

*Primary Examiner*—Thomas D. Lee
*Attorney, Agent, or Firm*—Fitzpatrick, Cella, Harper & Scinto

[57] ABSTRACT

An image processing method and apparatus for converting image data for use in a color CRT and an image processing device each having a different color reproducible range, for example, a color printer. Color component data of color image data corresponding to a most parts of a color reproducible range of the color printer having a color reproducible region which is narrower than that of the color CTR is not converted. The hue and the brightness of color component data of color image data exceeding the color reproducible range of the color printer are not substantially converted but only chromaticness is converted. A part deviated from the color reproducible range can be approximated to the outer periphery of the reproducible range. Furthermore, the most part of the color reproducible range is correctly color-reproduced and the color image is converted so as to make a portion of the same to be a compressed space of an all color space. Therefore, a color image can be converted such that a color image can be reproduced while maintaining color continuity even if the color deviates from the color reproducible range of the color printer.

13 Claims, 27 Drawing Sheets

| DISTANCE / θ | Di | Ei | Fi | PRODUCT COEFFICIENT b TABLE | PRODUCT COEFFICIENT a TABLE |
|---|---|---|---|---|---|
| 0 | D0 | E0 | F0 | D0f / D0i | (E0f-D0f) / (F0i-D0i) |
| 1 | D1 | E1 | F1 | D1f / D1i | |
| ... | ... | ... | ... | ... | ... |
| θ | Dθ | Eθ | Fθ | Dθf / Dθi | (Eθf-Dθf) / (Fθi-Dθi) |
| ... | ... | ... | ... | ... | ... |
| 358 | D358 | E358 | F358 | | |
| 359 | D359 | E359 | F359 | D359f / D359i | (E359f-D359f)/(F359i-D359i) |

↑ D-TABLE   ↑ E-TABLE   ↑ F-TABLE

FIG. 5

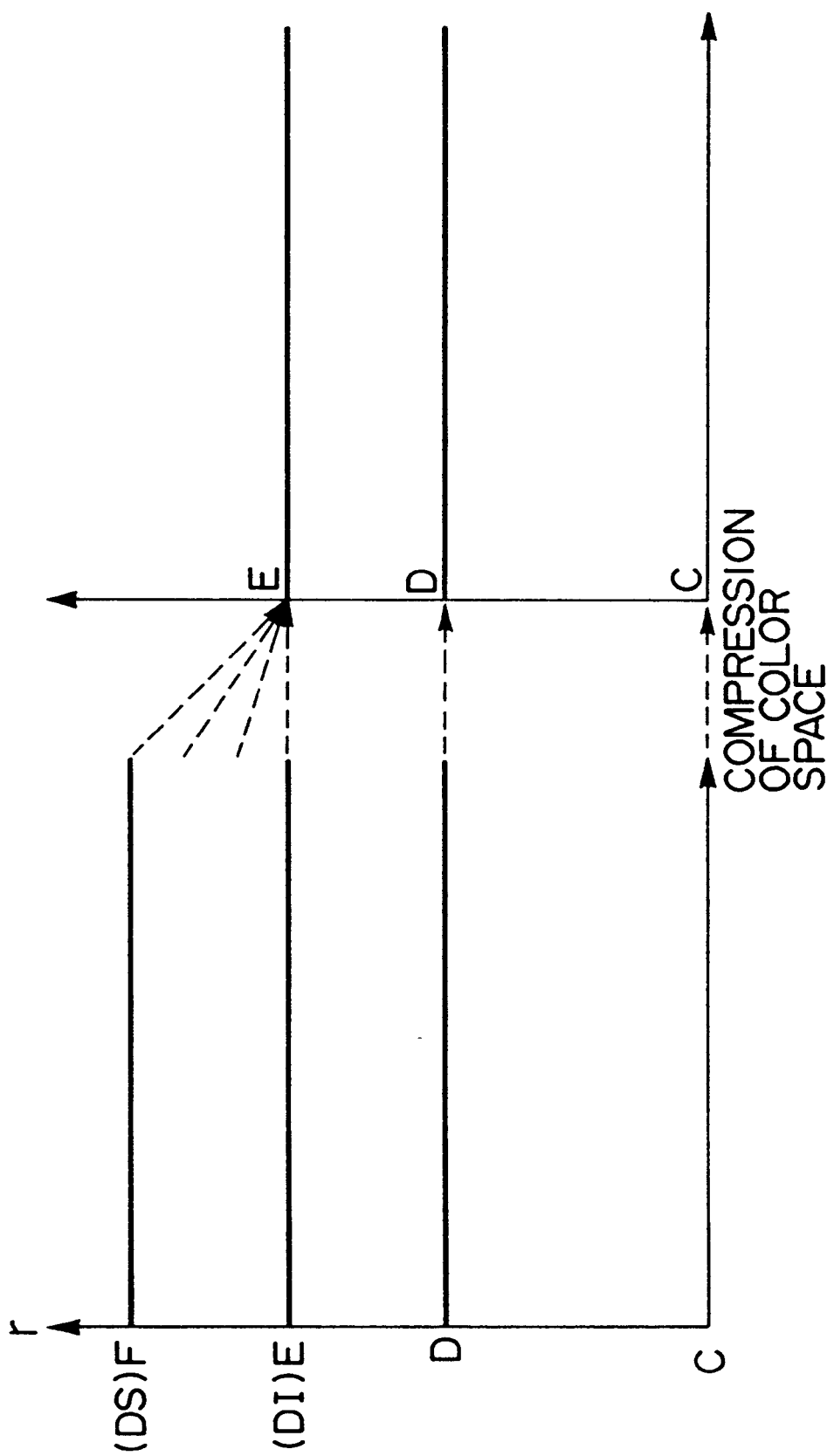
F I G. 6

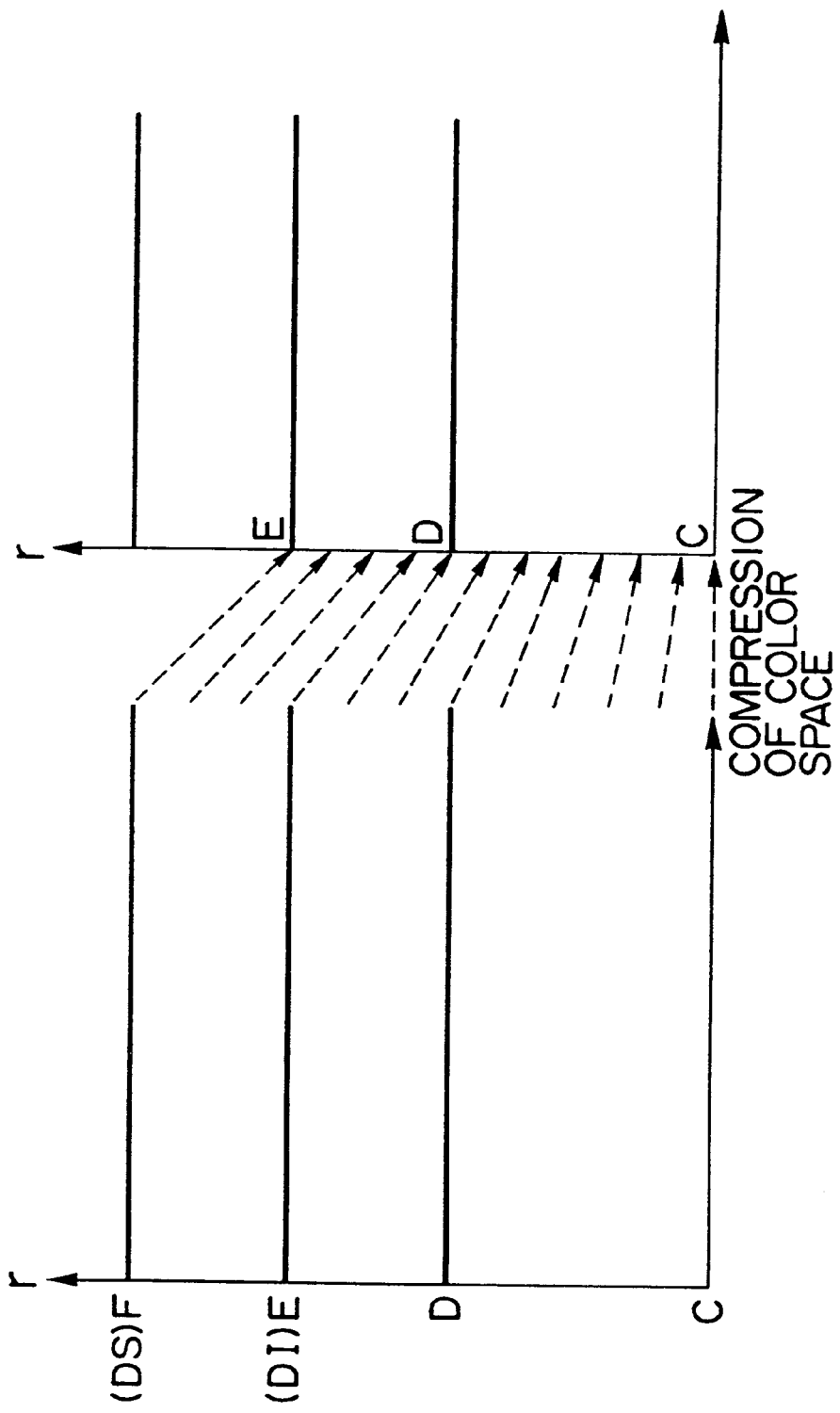
F I G. 7

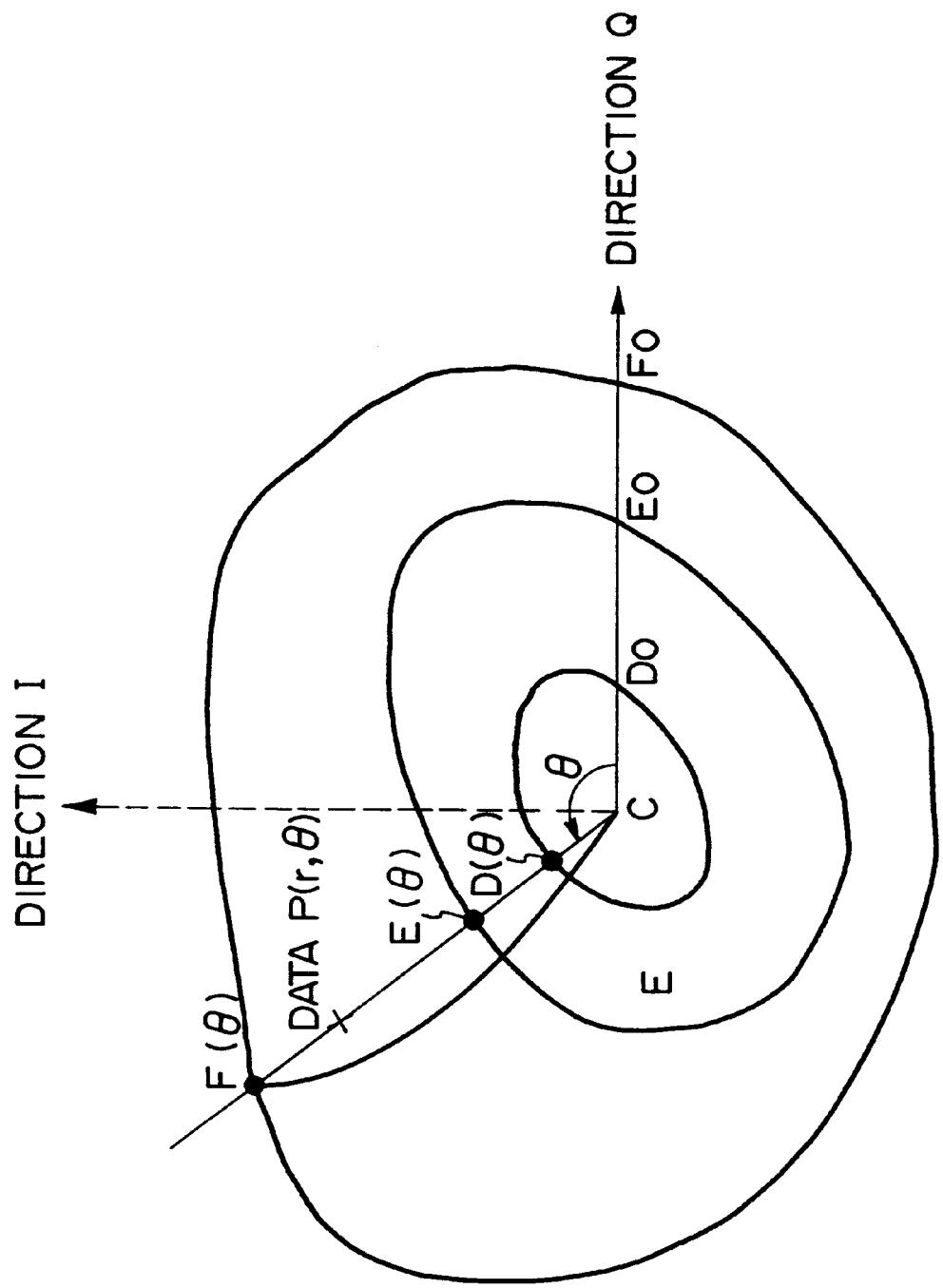
F I G. 16

HUE CORRECTION TABLE 1

| DISTANCE \ θ | r1 | r2 | r3 | ... | rn | ... | (Fθ) rmax |
|---|---|---|---|---|---|---|---|
| 0 | θ(r1,0) | θ(r2,0) | : | : | : | : | θ(rmax,0) |
| 1 | θ(r1,1) | | : | : | : | : | θ(rmax,1) |
| 2 | θ(r1,2) | | : | : | : | : | θ(rmax,2) |
| --- | | | : | : | : | | |
| θn | θ(r1,θn) | | | | θ(rn,θn) | | |
| --- | | | | | | : | |
| 358 | θ(r1,358) | | | | | : | |
| 359 | θ(r1,359) | | | | | : | |

FIG. 17

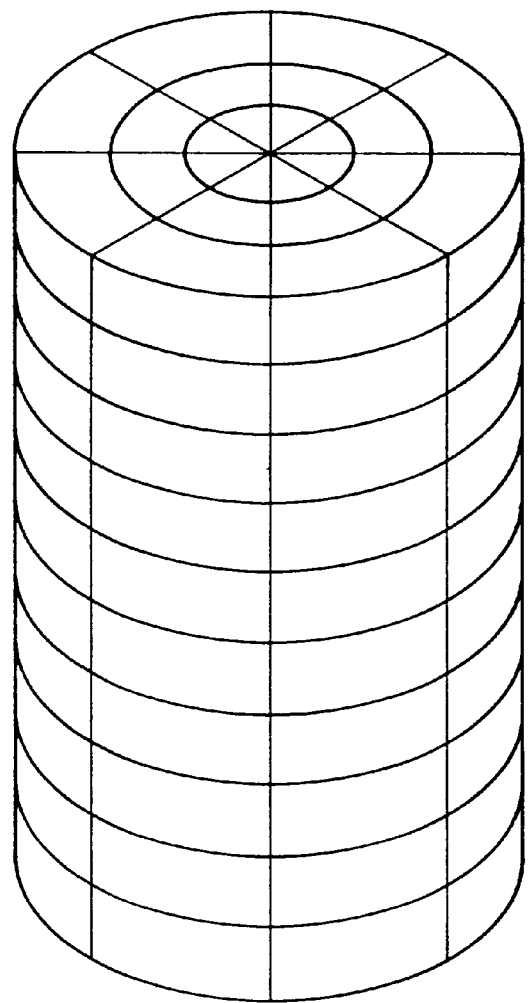
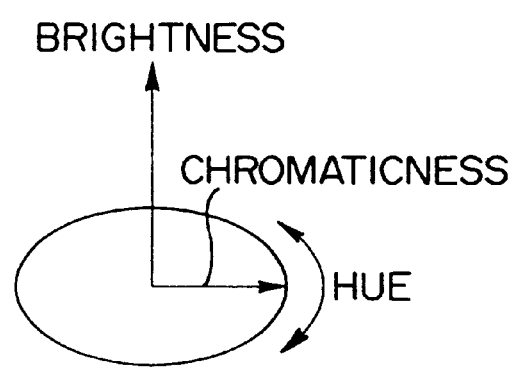
F I G. 22A

COLOR IMAGE PROCESSING METHOD AND APPARATUS THEREFOR

This application is a continuation of application Ser. No. 07/785,097 filed Oct. 30, 1991, now abandoned.

BACKGROUND OF THE INVENTION

1. Field of the Invention

The present invention relates to an image processing method and apparatus therefor for converting the color space of color image data in accordance with a color reproducible range of an image forming apparatus.

2. Description of the Related Art

Hitherto, there has been an apparatus for receiving color image data (multi-value data) supplied from a color scanner or the like and performing color recording by means of a color printer in accordance with the above-described color image data. In this case, there arises a case where the color characteristics (characteristics of read color) of the color scanner and the color reproducible characteristics (color reproducible range) of the printer are not equal to each other. In this case, instead of a discrimination being performed as to the range on the color space which is specified by the values (0 to 255) which can be possessed by multi-value data (8-bit) supplied from, for example, the scanner, an interpretation is made that the above-described multi-value image data is image data which is adapted to the color space range which can be reproduced by the printer. In accordance with the multi-value data, recording is performed by the printer.

Therefore, if the devices have respectively different color reproducible regions in a case where a hard copy or a soft copy of an original image is obtained, an interface for receiving/transmitting image data cannot be established, or data must be forcibly replaced with image data adapted to the printer side. In this case, if the result of masking cannot be compressed into 8 bits due to, for example, the difference in the color reproducible region, image data is cut to 8 bits such that data larger than "255" is made to be "255" and data smaller than "0" is made to be "0". Therefore, there arises a problem in that color of an original document or original image data cannot be correctly reproduced by the printer side and the original color is reproduced in a different color.

SUMMARY OF THE INVENTION

Accordingly, an object of the present invention is to provide an image processing method and apparatus capable of satisfactorily converting an image adaptable to the color reproducible range of image data.

Another object of the present invention is to provide a color image processing method and apparatus in which image data is converted for use in image processing devices each having different color reproducible ranges and in which chromaticness is converted while substantially inhibiting conversion of hue and brightness.

That is, in order to achieve the above-described object, the image processing method and apparatus according to the present invention is a method for converting image data for use between image processing devices each having different color reproducible ranges and arranged in such a manner that the hue and the brightness are not substantially converted and the chromaticness is converted.

Another object of the present invention is to provide an image processing method and an apparatus therefor in which a major portion of a color reproducible range is correctly color-reproduced in a color reproduction range of an image forming apparatus and the color image of a portion of the same is constituted so as to be a compressed space of an all color space so that a color image can be reproduced while maintaining color continuity in a range deviated from the color reproducible range of the image forming apparatus.

In order to achieve the above-described object, according to one aspect of the present invention, there is provided an image processing method for converting a color space range of color image data to transmit it to the image forming apparatus, data of color components of color image data which corresponds to a major portion of the color reproduction range of the image forming apparatus is not converted but color image data, which exceeds the color reproduction range is compressed/converted into a space of the color reproduction range on the same hue line in the color space so as to transmit it to the image forming apparatus.

Another object of the present invention is to provide an image processing method and an apparatus in which a major portion of a color reproducible range is correctly color-reproduced in a color reproduction range of an image forming apparatus and the color image of a portion of the same is constituted so as to be a compressed space of an all color space so that a color image can be reproduced while maintaining color continuity in a range deviated from the color reproducible range of the image forming apparatus.

In order to achieve the above-described object, according to an aspect of the present invention, there is provided an image processing method for converting the color space range of color image data so as to be transmitted to an image forming apparatus; the image processing method comprising the steps of: inhibiting conversion of data about the color component of color image data which corresponds to a major portion of a color reproducible range of the image forming apparatus; and converting color image data, which exceeds the color reproducible range, into color image data which corresponds to the nearest outermost periphery position in the color reproducible range.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 illustrates data contents of each table corresponding to each angle;

FIG. 6 illustrates a color conversion method according to a second embodiment of the present invention;

FIG. 7 illustrates a color conversion method according to a third embodiment of the present invention;

FIG. 16 illustrates a color space;

FIG. 17 illustrates a data structure in a hue correction table;

FIGS. 22A and 22B illustrate block codes according to a seventh embodiment of the present invention;

DESCRIPTION OF THE PREFERRED EMBODIMENTS

Figure 12:
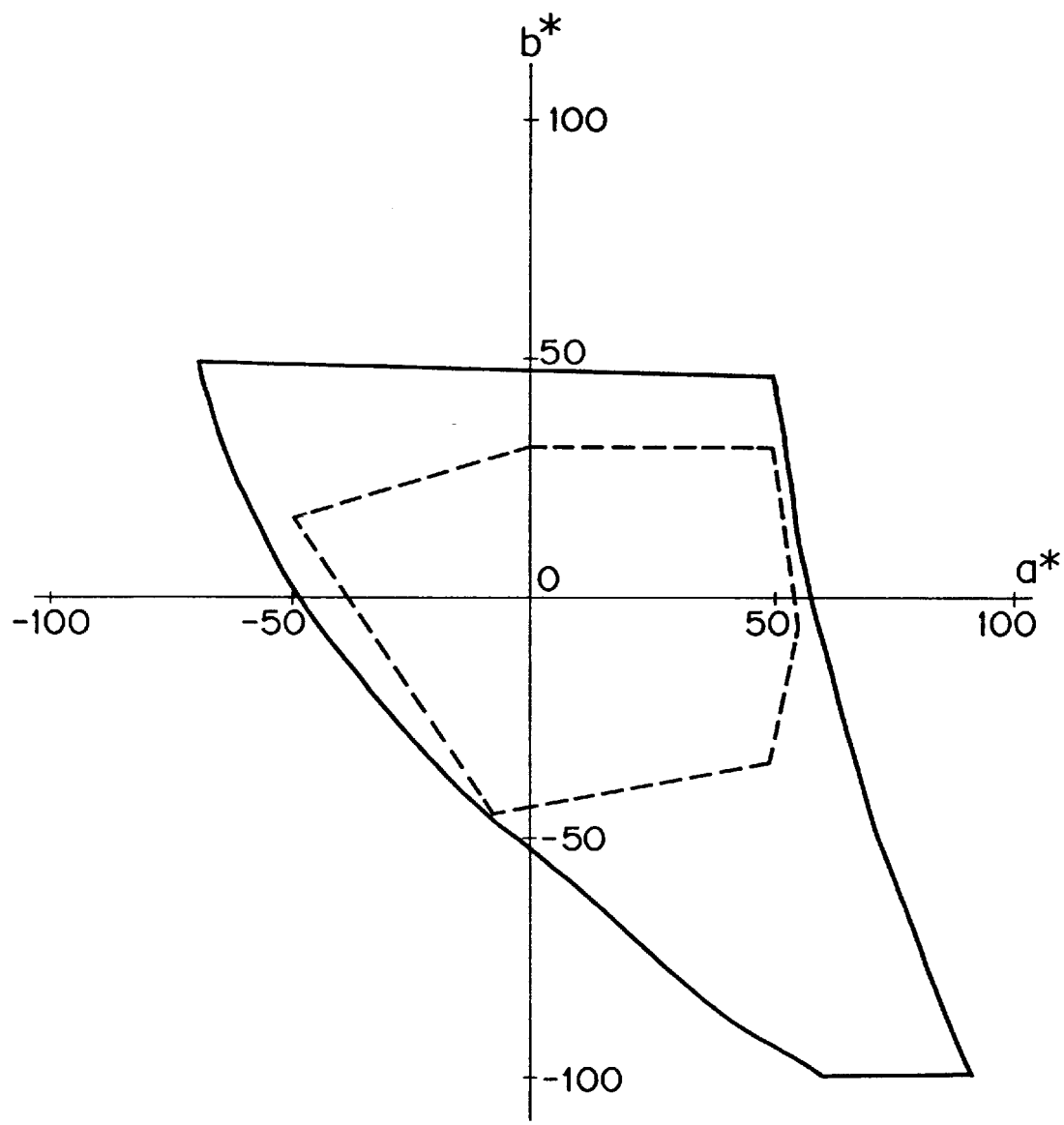
FIGS. 12 and 13 illustrate a color reproducible range for a CRT and a printer respectively.

Prior to making descriptions about preferred embodiments of the present invention with reference to the drawings, the principle of realizing an image processing method according to the present invention will be described. The color reproducible range (a region designated by a dashed line of FIG. 12) of ink employed in a color hard copying operation is narrower than a color data expression region (a region designated by a solid line of FIG. 12) processed by color data or computer graphics picked up by a scanner. Therefore, data deviating from the range of color reproducible by the color hard copy apparatus (printer) must be compressed (subjected to mapping) to colors which can be expressed. FIG. 12 illustrates the range (solid line) of color reproducible by a CRT and that (dashed line) by a printer by using L*=50 a* b* chromaticity diagram of the CIE1976L* a* b* space, which is a uniform color space.

In order to perform the above-described mapping, the reproducible range of a hard copy apparatus such as a printer and that of color data of the CRT or the like must be obtained. First, a method of obtaining the color reproducible range for a printer will now be described. A printer is able to create all its colors by using four ink colors, that is, Cyan, Magenta, Yellow and Black (hereinafter respectively called "C", "M", "Y" and "Bk"). Now, a description will be made about a case in which a gradation expression is performed in accordance with the density pattern method. The density pattern method is a method of expressing gradation by constituting one pixel by a pixel matrix composed of a plurality of elements in such a manner that a threshold matrix and data for C, M and Y are subjected to comparisons to make the element of a pixel matrix which is larger than the threshold, "1" (that is, ink is applied). The above-described matrix is constituted by combining the following four elements:

(1) Element of subtractive mixture of color stimuli (Bk') of all of C, M and Y, (2) Element of subtractive mixture of color stimuli (R, G and B) prepared by combining two colors selected from C, M and Y, (3) Element of either one of C, M or Y, (4) Element (white) of no ink.

When the undercolor removal in which Bk' of element (1) is replaced by black ink (Bk) is performed to make the threshold matrix the same as that of C, M and Y, the above-described elements (1) to (4) are made to be as follows:

| | |
|---|---|
| Bk=min (C, M, Y) | Element (1) |
| Mix=min (C1, C2) | Element (2) |
| P=max (C, M, Y)—Bk—Mix | Element (3) |
| W=S—Bk—Mix—P | Element (4) | where min (C, M, Y) is the minimum value from among C, M and Y; max (C, M, Y) is the maximum value from among C, M and Y; Mix is the element value of each of R, G and B; C1 and C2 are selected from each of (C—Bk), (M—Bk) and (Y—Bk) that is not "0"; P is the element value of each of C, M and Y; and S is the value of all elements of the matrix.

All of the colors of each pixel are additive mixtures of color stimuli of the above-described four elements, that is, 8 colors. The color specification values, that is, the values X, Y and Z of the above-described 8 colors can be obtained from the following Equation (1) while making an assumption that the area ratios of the colors are Sw, Sc, Sm, Sy, Sr, Sg, Sb and Sbk:

$$\begin{vmatrix} X \\ Y \\ Z \end{vmatrix} = \begin{vmatrix} Xw & Xc & Xm & Xy & Xr & Xg & Xb & Xbk \\ Yw & Yc & Ym & Yy & Yr & Yg & Yb & Ybk \\ Zw & Zc & Zm & Zy & Zr & Zg & Zb & Zbk \end{vmatrix} \times \begin{vmatrix} Sw \\ Sc \\ Sm \\ Sy \\ Sr \\ Sg \\ Sb \\ Sbk \end{vmatrix} \quad (1)$$

where $X_{c1}, Y_{c1}, Z_{c1}$ (c1=w, c, m, y, r, g, b, bk) are coordinate values of the ink colors in the XYZ space.

Thus, all of the colors made by mixture C, M, Y and Bk ink are expressed by the XYZ color space, and the results thus-obtained can be converted into the CIE1976L* a* b* space, which is the uniform color space, in accordance with the following Equation (2), so that the color reproducible range for the printer can be calculated:

$$L^* \begin{cases} 116 \, (Y/Yo)^{1/3} - 16 & (Y/Yo > 0.008856) \\ 903.29 \, (Y/Yo) & (Y/Yo \leq 0.008856) \end{cases} \quad (2)$$

-continued
$$a^* = 500\{(X/Xo)^{1/3} - (Y/Yo)^{1/3}\}$$
$$b^* = 500\{(Y/Yo)^{1/3} - (Z/Zo)^{1/3}\}$$

Each of $X_0$, $Y_0$ and $Z_0$ respectively indicates X, Y and Z of the standard light source.

Then, the method of calculating the color reproducible range for the CRT will now be described. A CRT reproduces color by additive mixtures of color stimuli of R, G and B. By making R, G and B at this time to be data items which are in proportion to the voltage to be applied to the cathode of the CRT, the XYB specification value of a pixel can be obtained from Equation (3):

$$\begin{vmatrix} X \\ Y \\ Z \end{vmatrix} = \begin{vmatrix} Xr & Xg & Xb \\ Yr & Yg & Yb \\ Zr & Zg & Zb \end{vmatrix} \times \begin{vmatrix} R^{gma} \\ G^{gma} \\ B^{gma} \end{vmatrix} \quad (3)$$

where gma=2.2 (the gamma value of CRT) and each of $X_i$, $Y_i$ and $Z_i$ (i=r, g, b) respectively indicates coordinate value of R, G and B in the XYZ space.

Similarly to the case of the printer, the above-described coordinate values are converted by using Equation (2) into the CIE1976L* a* b* space, so that the color reproducible range for the CRT can be calculated.

The color reproducible range for each of the printer and the CRT can be obtained according to the above-described method. Now, the method of mapping will now be described.

Figure 13:
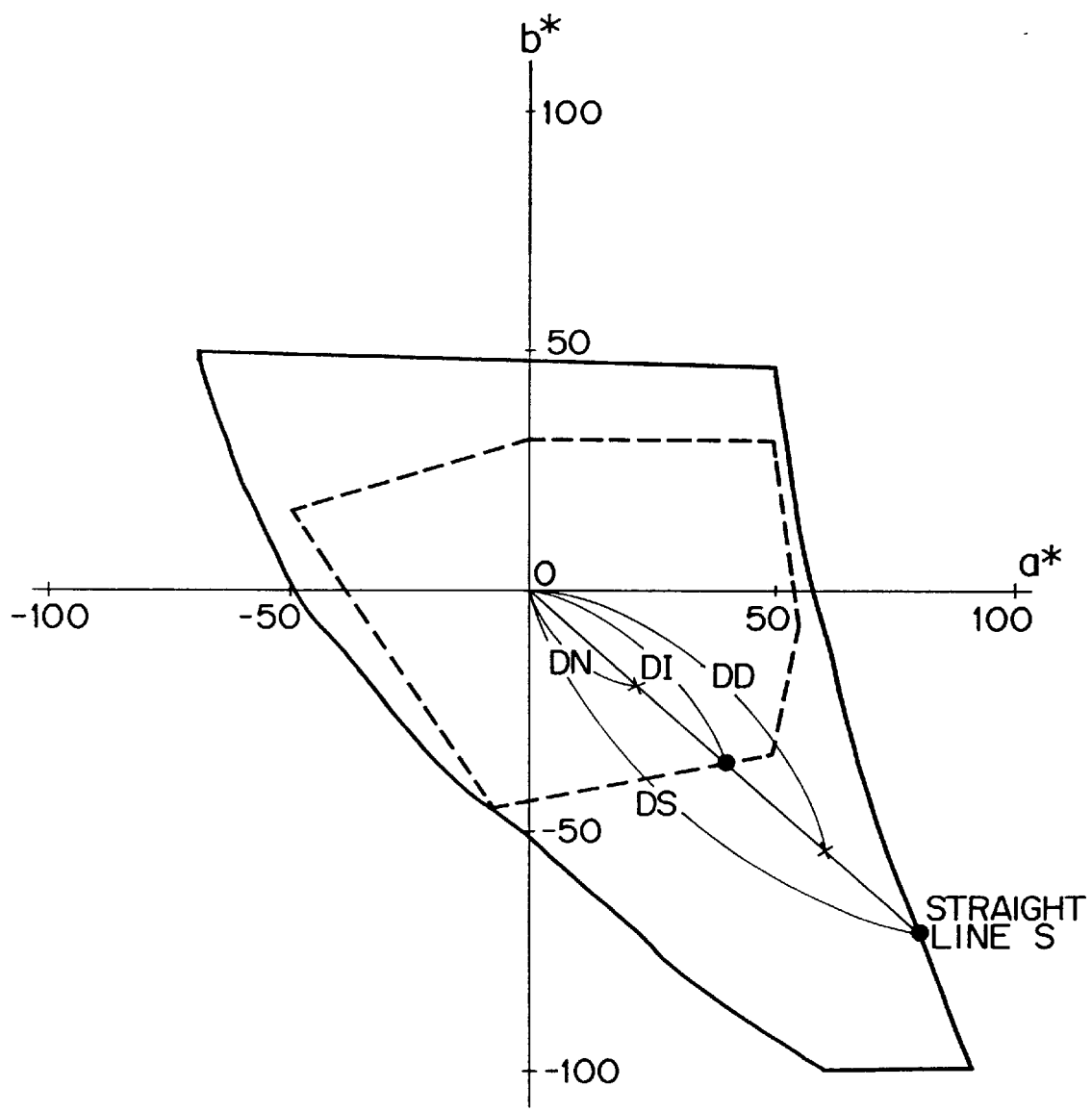

FIG. 13 illustrates parameters DS, DI, DD, DN and straight line S drawn on the color reproducible ranges shown in FIG. 12. First, the above-described parameters for use in mapping will now be described.

DS: the distance (color difference) on the straight line S between a coordinate point having the highest chromaticness and the center;

DI: the distance (color difference) on the straight line S between a coordinate point having the highest chromaticness in a region expressed by ink and the center;

DD: the distance (color difference) on the straight line S between a coordinate point obtained by calculations in accordance with input signal RGB and the center; and DN: the distance (color difference) on the straight line S between a coordinate point subjected to a compression (mapping) and the center.

By using the above-described four parameters DS, DI, DD and DN, the color compression (mapping) according to the present invention can be realized. Now, five kinds of mapping methods will be described.

(1) A conventional method in which colors reproducible by the printer are transmitted as they are (without mapping), while colors which are not reproducible are subjected to mapping to reproducible colors which, as shown in Equation (4), show the minimum color difference in the L* a* b* space:

$$dE=(dL^{*2}+da^{*2}+da^{*2})^{1/2} \quad (4)$$

(2) Colors reproducible by the printer are transmitted as they are, while colors which cannot be reproduced are subjected to a process in which the brightness of color data and the hue are not changed but only the chromaticness is compressed so as to be subjected to mapping at the outer periphery of the color reproducible range:

DN=DD (when DD≦D1)

DN=DI (when DD>D1)  (5)

(3) Only the chromaticness of color data is subjected to linear mapping in the reproducible range as shown in Equation (6) regardless of the color reproducibility by the printer:

$$DN=DD \times DI/DS \quad (6)$$

(4) Only the chromaticness of color data is subjected to linearly compressed in an exponential manner as shown in Equation (7) regardless of the color reproducibility by the printer (this method is a method in which the compression ratio is in proportion to the distance from the center):

$$DN=DD\{1-(1-DI/DS)^{DS/DD}\} \quad (7)$$

(5) Color data within a specific ratio of the color reproducible range of the printer, for example, color data within a distance of 80% from the center, is transmitted as it is, while only the chromaticness of color data (including unreproducible color data) deviating from the above-described range is, as shown in Equation (8), subjected to linear mapping to a distance of 80 to 100% from the center of the reproducible range DN=DD (when DD≦D8)

$$DN=\{(DD-D8) \times (DI-D8)/(DS-D8)\}+D8 \text{ (when } DD>D8) \quad (8)$$

where D8=0.8×DI

Figure 14:
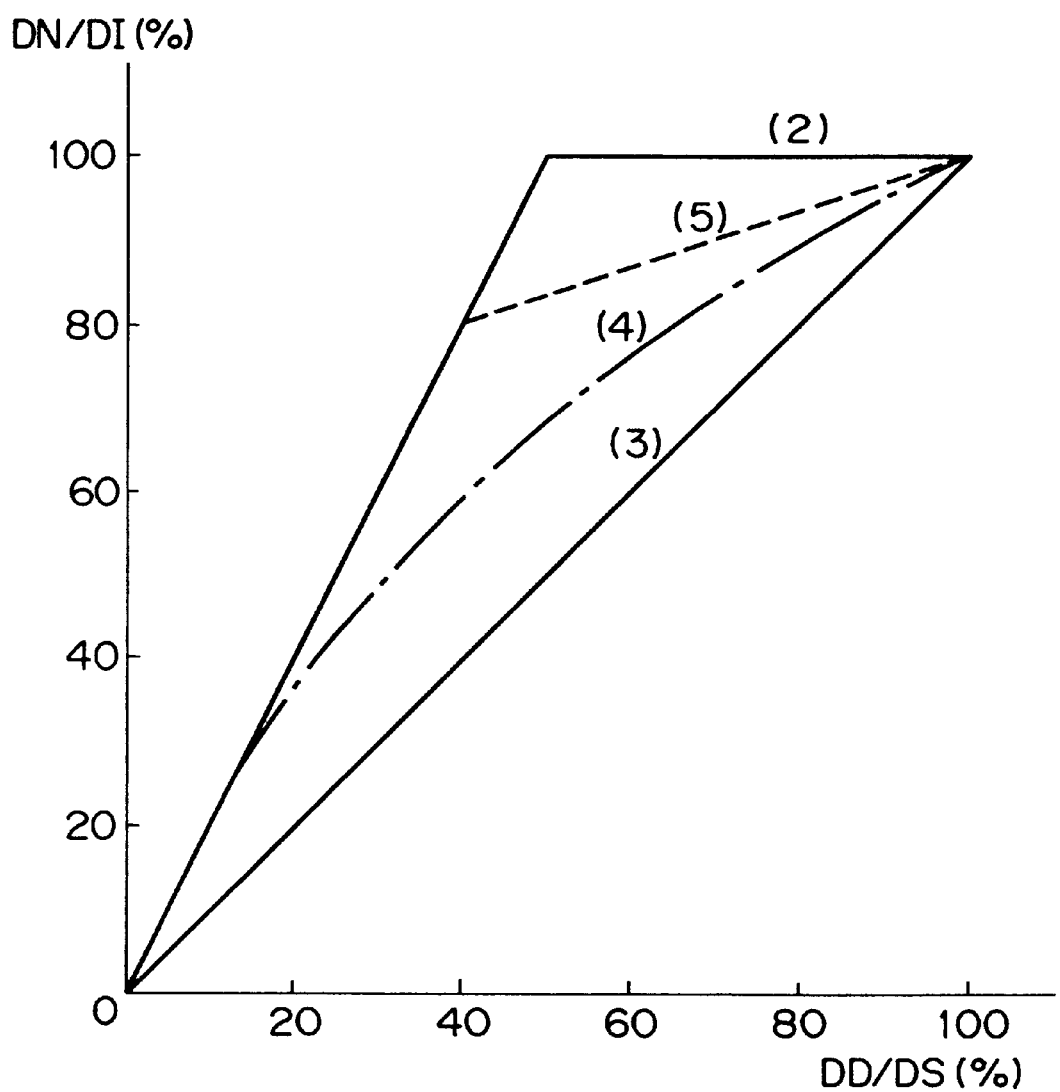
FIG. 14 illustrates chromaticness compression characteristics by means of mapping.

Among the above-described five kinds of mapping methods, graphs of methods (2) to (5) are shown in FIG. 14, where the axis of abscissa stands for plotted DD normalized by DS and axis of ordinate stands for plotted DN normalized by DI. In accordance with the above-described mapping method, color data deviating from the color reproducible range of a printer can be compressed to a color reproducible range.

Now, the structure of an apparatus according to the present invention arranged in accordance with the above-described principle and capable of realizing the color space compression will be described.

Figure 2:
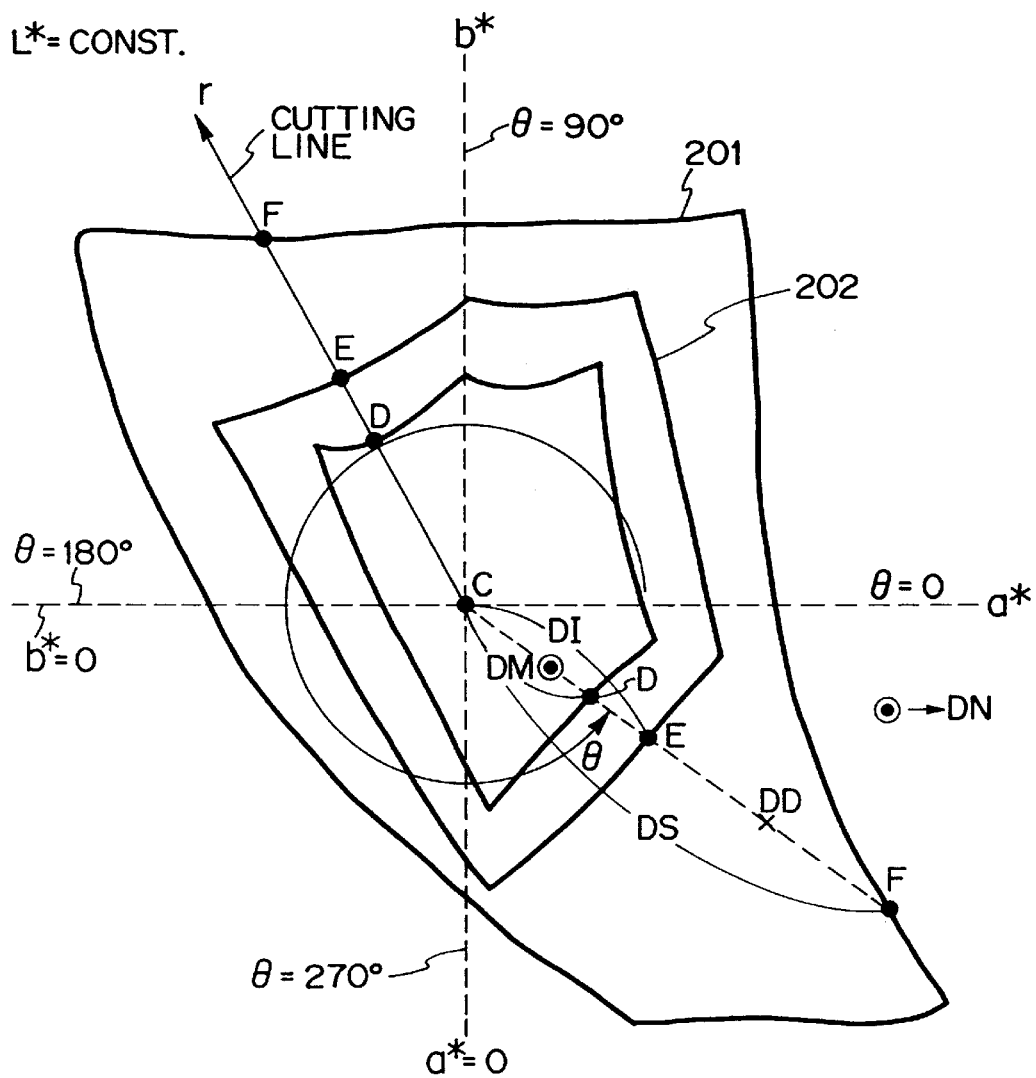
FIG. 2 illustrates a range of a color space.

FIG. 2 illustrates a color space expressed by the L* a* and b* coordinate system. A closed curve 20 including point F shows the outer periphery of all of color spaces which can be reproduced/expressed by a given CRT, while a closed curve 202 including point E shows the outer periphery of the color space which can be color-reproduced by the hard copy apparatus. Referring to FIG. 2, an assumption is made that L* is constant and figures showing the color reproducible range for a CRT and that for the hard copy apparatus are present for each value of L*. The present invention is not limited to the arrangement of the value of L* made to be in units of, for example 0.1 or 10. Although FIG. 2 illustrates the L* a* b* color space according to this embodiment, no problem arises if it is a Y, I, Q or L* u* v* uniform perceptual color space. The present invention is not limited to the above-described L* a* b* color space.

An example of the process of performing color space compression of a portion in the closed curve 201 including point F, that is, the color reproducible range of the CRT, to the portion in the closed curve 202 including point E, that is, the color reproducible region of the hard copy apparatus will now be described in detail.

A case will now be described in which the portion of a distance of M % of DI shown in FIG. 2 of the color reproducible region 202 of the hard copy apparatus is directly color-reproduced (for example, M=80) and other portions are linearly compressed. A distance of M % is made to be DM.

An assumption is, as shown in FIG. 2, made that the distance from a* b* chromaticity point of the color on the CRT to the origin is DS, the distance from the origin to the outer periphery of the color reproducible region of the hard copy apparatus is DI, before the color space compression is performed, the distance to the a* b* coordinate position is DD, and after the color space compression is performed the color coordinate is DN. The above-described distances DN, DI, DD, DS and DM are present on the same straight line. Therefore, assuming that an angle made between the origin of the a* b* coordinate and axis a* is 0°, there are combinations DNθ, DIθ, DDθ, DSθ and DMθ for all continuous angles θ from 0° to 360°. However, a dispersed operation is performed in a practical application in such a manner that one unit of θ is arranged to be 0.1° or 1°. According to the first embodiment, the color space compression is performed assuming the above-described assumption in accordance with the following logical expression:

DN=DD (DD≦DM)

DN=(DD-DM)×(DI-DM)/(DS-DM)+DM(DD>DM)

where DM=(M/100)×DI.

Since the above-described color space compression is performed in such a manner that the compression is performed under a condition of L=constant and on a straight line extending from the origin, the chromaticness is compressed while maintaining the hue. A plane which is cut by a cutting line thus-formed is shown in FIG. 3.

Figure 3:
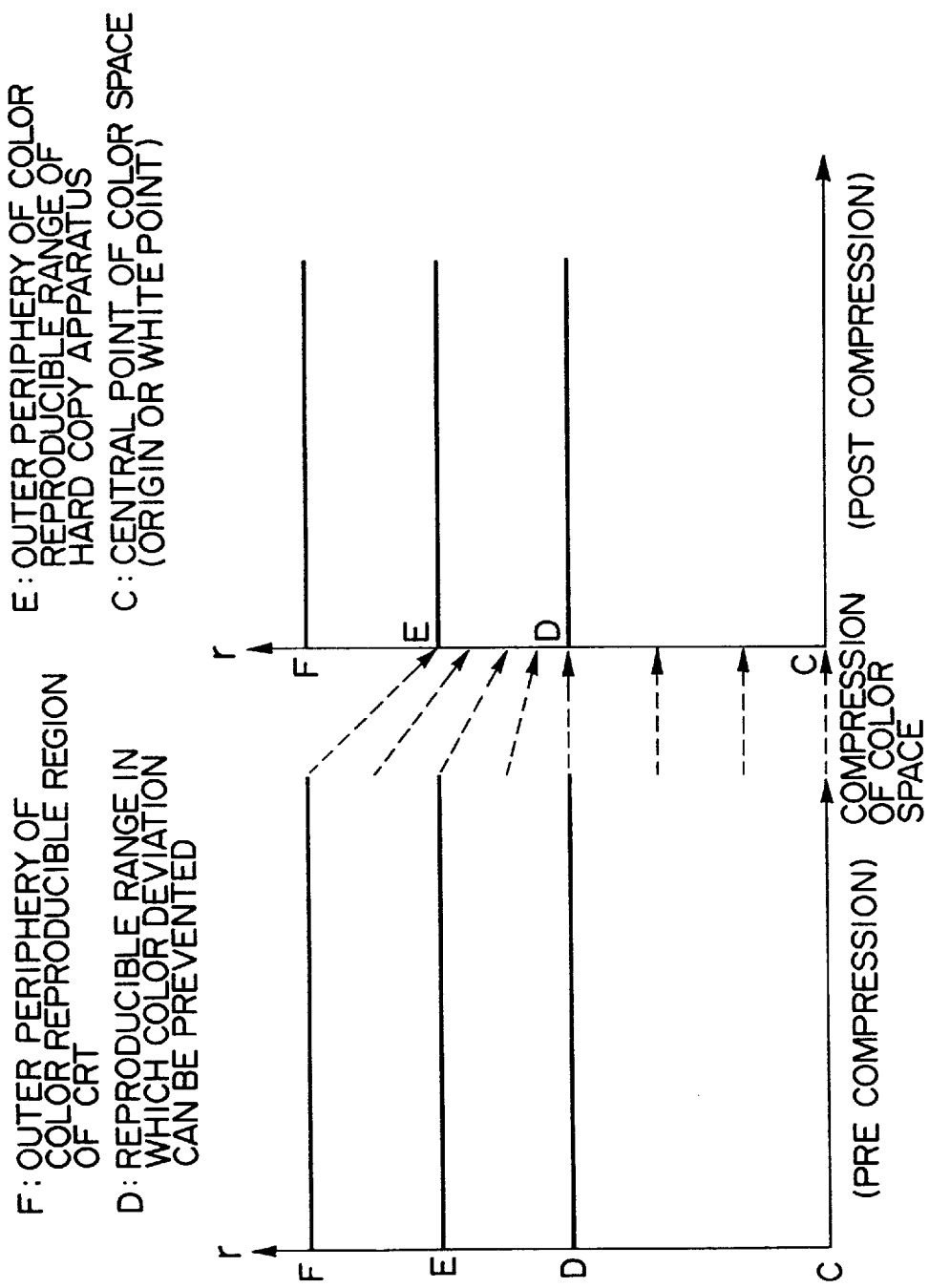
FIGS. 3 and 4 illustrate a color conversion method.

As shown in FIG. 3, points on segment DF of the cutting line are linearly compressed on DE, while points on CD are not compressed, but the values of the same are directly stored because they are included in the color reproducible region of the hard copy apparatus.

Figure 4:
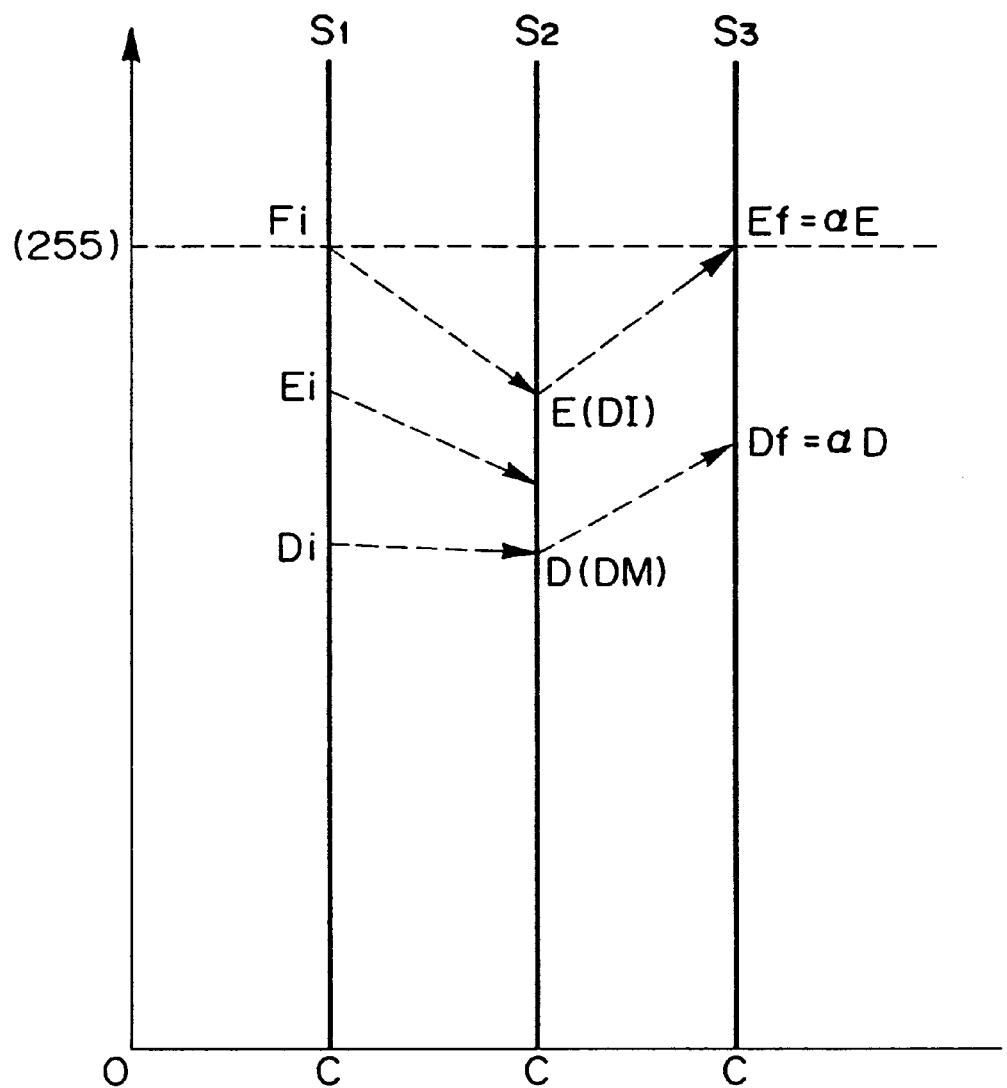

Referring to FIG. 4, a case where the color components in the color reproducible range of the CRT are made to be 8 bits (0 to 255) is designated by S1, while the range of the values which can be possessed by the color components when the above-described color components are color-compressed under the above-described condition is designated by S2. Furthermore, S3 shows a state of normalizing, to 8 bits, the range of values which can be possessed by the color components when the color compression is performed under the above-described condition. Finally, $D_i$ is converted into $D_f$, while $F_i$ is converted into $E_f$.

Figure 1:
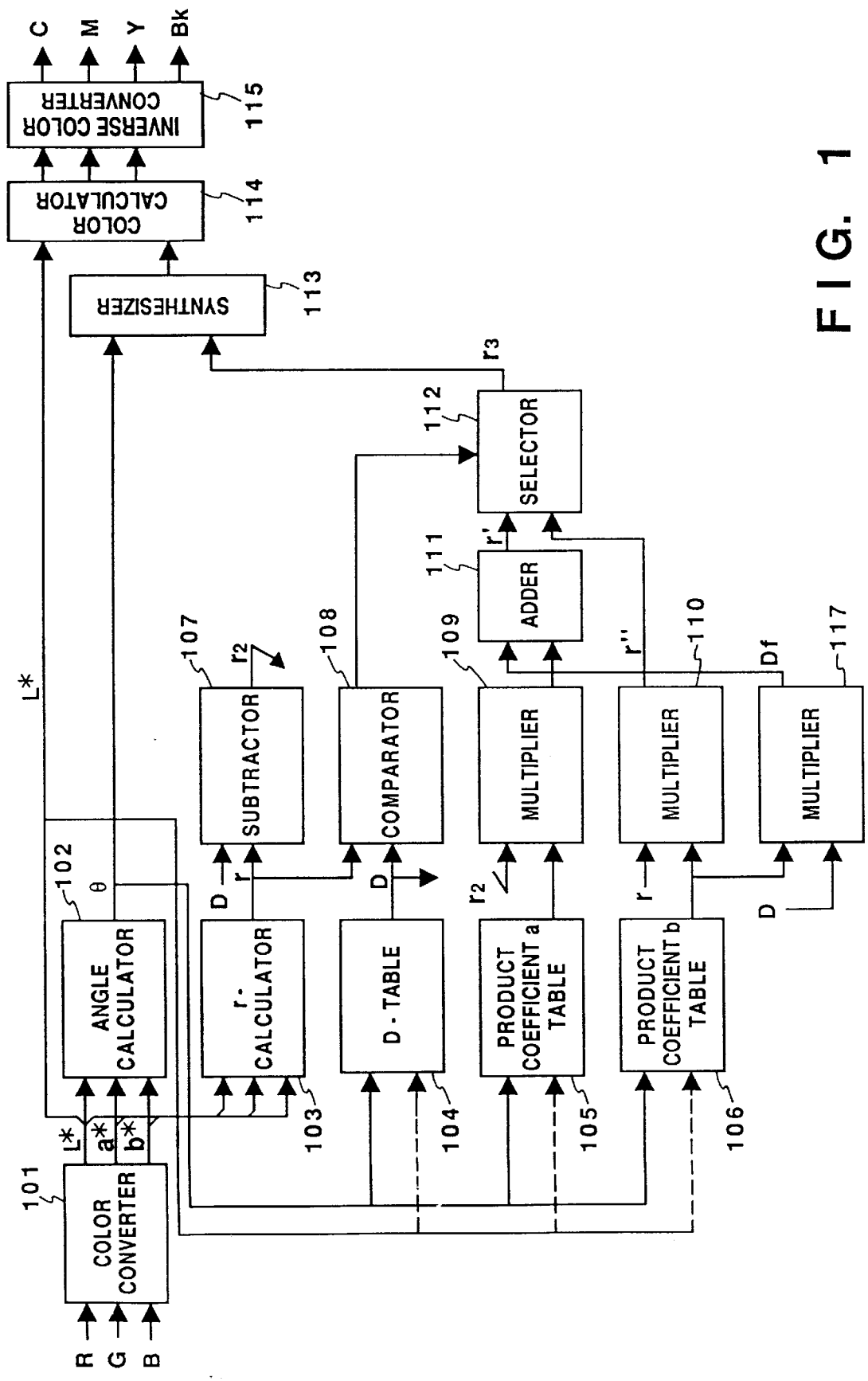
FIG. 1 is a block diagram which illustrates the structure of hardware according to a first embodiment of the present invention.

FIG. 1 is a block diagram which illustrates an embodiment of hardware capable of performing the above-described color space compression.

Reference numeral 101 represents a color converter capable of temporarily converting image data for R, G and B obtained by the CRT into X, Y, Z color system.

$$\begin{vmatrix} X \\ Y \\ Z \end{vmatrix} = \begin{vmatrix} Xr & Xg & Xb \\ Yr & Yg & Yb \\ Zr & Zg & Zb \end{vmatrix} \times \begin{vmatrix} R^{gma} \\ G^{gma} \\ B^{gma} \end{vmatrix}$$

where gma is the gamma value of the CRT and R, G and B respectively are voltage values (0 to 1) to be applied to the CRT.

Then, the conversion to L* a* b* is made before data is normalized to 0 to 255 (8 bits) which serve as the coordinate value of point DD. Although the conversion is made into L* a* b* color space according to this embodiment, the conversion may be made into a uniform color space such as L, u, v or Y, I, Q or the like.

Image data converted, by the color converter 101, into the L* a* b* color space is supplied to an angle calculator 102. The angle calculator 102 obtains angle θ which is the angle of rotation of subject color data with respect to axis a on the a*, b* coordinate axis. Assuming that the coordinate value of a*, b* is (A, B), angle θ can be obtained by using either of the following equations:

$$\tan^{-1}\frac{B}{A}(A \neq 0) \text{ or } \sin^{-1}\frac{B}{\sqrt{A^2+B^2}}$$

$$\cos^{-1}\frac{A}{\sqrt{A^2+B^2}} \qquad \left(\sqrt{A^2+B^2} \neq 0\right)$$

Also the output from the color converter 101 is supplied to an r-calculator 103 in which $r=\sqrt{A^2+B^2}$ is calculated as well as distance r from the origin to DD, so that the coordinates (A, B) in a orthogonal coordinate system are converted into (rcos θ, rsin θ) to polar coordinater, θ.

Output θ from the angle calculator 102 is supplied to a D-table 104, a product coefficient a table 105 and a product coefficient b table 106.

Values $F_i$, $E_i$ and $D_i$ of the color space reproduced by the CRT shown in FIG. 4 are different depending upon angle θ (hue). As shown in FIG. 2, each of D, E and F respectively shows the color reproducible range (D) in which the color deviation can be prevented, the outer periphery (E) of the color reproducible range of the hard copy apparatus and the value (F) of the outer periphery of the color reproducible region by the CRT. $E_f$ and $D_f$ indicate the color reproducible range of the hard copy apparatus, and $E_f$ and $D_f$ are different with respect to angle θ. The distances r from points D, E and F determined in accordance with the color reproducible range of the CRT and the color hard copy apparatus to the origin are shown by $D_i$, $E_i$ and $F_i$ corresponding to angle θ as shown in FIG. 5. FIG. 5 is prepared for each value of L*. Any one of $F_0$ to $F_{359}$ which shows the maximum value with respect to all of the values of L* is "255" (8 bits). Although the unit of the angle q is arranged to be 1° according to this embodiment, it may be larger or smaller than that. As an alternative to this, non-equal units of the angle θ may be employed.

According to this embodiment, quantization data to be supplied to the color hard copy apparatus with respect to each angle θ is obtained. As described above about the principle, $D_f$ and $E_f$ shown in FIG. 4 are determined after the color reproducibility of the color hard copy apparatus has been obtained, and are written in the form of $D_f/D_i$ in product coefficient b table 106 with respect to angle θ, while the values of $(E_f-D_f)/(F_i/D_i)$ with respect to angle θ are written to a product coefficient a table 105.

Output r from r calculator 103 is supplied to a comparator 108 and the value of r2=r-Dθ$_i$ is calculated in a subtractor 107. It corresponds to (DD-DM) in the description about the principle.

In this state, r=DD, Dθ$_i$=DM=DI×M/100, Dθ$_i$ is data transmitted from D-table 104 and shows $D_i$ with respect to angle θ.

The result of the calculation, that is, r2 (=r-Dθ$_i$) is supplied to a multiplier 109 so as to be multiplied with the output from the product coefficient a table 105. (Eθ$_f$-Dθ$_f$)/(Fθ$_i$-Dθ$_i$) corresponds to α times (DI-DM)/(DS-DM) shown in the description about the principle (α(DI-DM)=

$E\theta_f - D\theta_f$). The output $(\alpha(DI-DM)\times(DD-DM)/(DS-DM))$ from the multiplier 109 is added to the output from a multiplier 117 in an adder 111 so as to be transmitted to a selector 112.

On the other hand, output $D\theta_i$ and $D\theta_f/D\theta_i=\alpha$ supplied from the product coefficient b table 106 are received by the multiplier 117. As a result, $D\theta_f$ ($\alpha$ times DM shown in the principle) is obtained so that the adder 111 transmits $(\alpha(DI-DM)\times(DD-DM)/(DS-DM)+\alpha DM))$ which is DN (r', $\theta$) which is obtained by color-space compressing of color coordinate DD (r, $\theta$), where the output from the adder 111 in a case where r (DD) is $r > D_i$ (corresponds to a case DD>DM) can be expressed by:

$$r' = a\{(DD-DM) \times (DI-DM)/(DS-DM)+DM)\}$$

On the other hand, the output $(D\theta_f/D\theta_i=\alpha)$ from the product coefficient b table 106 is supplied to a multiplier 110 so as to be multiplied with r (DD) supplied from the r calculator 103. As a result, r'' of image data after the color space compression has been performed in a case where $D\theta_i \geq r$ (DM$\leq$DD) can be obtained, r'' corresponding to $\alpha$DD.

Then, r' and r'' thus-obtained are supplied to a selector 112 in which either of them is selected so as to be transmitted as r3. Then, a signal with which the above-described selection can be made will now be described. Output r from the r calculator 103 is supplied to a comparator 108 in which a comparison is made whether or not $D\theta_i \geq r$ (DM$\geq$DD). The result of this comparison is supplied as a selection signal of the selector 112. As a result, a selection is made in such a manner that r3=r'' when $D\theta_i \geq r$ (DM$\geq$DD) and r3=r' in other cases. Data r3 after the color-space compression has been performed and output $\theta$ from an angle calculator 102 are made to be one data item as polar coordinates (r3, $\theta$) in a synthesizer 113. A color calculator 114 obtains $a^* = r3 \cdot \cos\theta$, $b^* = r3 \cdot \sin\theta$ from polar coordinates (r3, $\theta$) and as well as receives data $L^*$ supplied from a color converter 101. Then, data $L^*$, $a^*$ and $b^*$ are converted into C, M, Y and Bk signals for the hard copy apparatus by an inverse color converter 115.

In the inverse color converter 115, an LUT (Look Up Table) in which the color difference can be minimized can be used as described in the description about the principle.

Since the color reproducible region in the $a^*$ $b^*$ space becomes different depending upon the value of $L^*$, a plurality of tables such as D-table 104, the product coefficient a table 105 and the product coefficient b table 106 are switched over to change the output value. Actually, it is impossible to have infinite tables to correspond to all of $L^*$. Therefore, the table is switched over in accordance with $L^*$ obtained by an omission of fractions or the like while setting the width of the units. As an alternative to this, the values in the a-table 105 or the b-table 106 may be remade by performing an interpolation or the like while making references to some tables in accordance with the value of $L^*$.

FIG. 6 illustrates a color space compression according to a second embodiment of the present invention. According to this embodiment, a portion in a closed curve (designate by 202 of FIG. 2) including a limit point E in the color reproducible range of the color hard copy apparatus is reproduced as it is and the other portions of the color space is converted into values on the closed curve including the limit point E.

The above-described case corresponds to conditions DN=DD (DD$\leq$DI) and DN=DI (DD>DI). In this case, the conversion is performed by compressing of only chromaticness.

Figure 10:
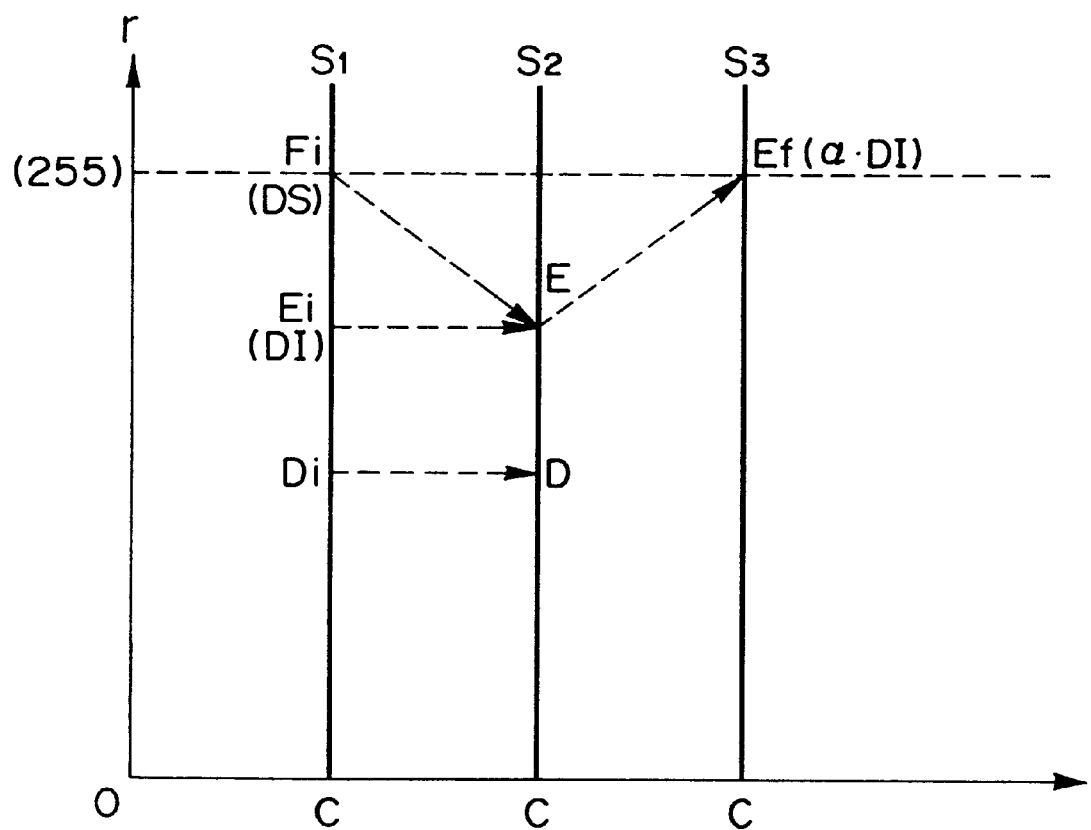
FIG. 10 illustrates a color conversion method according to the second embodiment of the present invention.

FIG. 10 illustrates the portion according to the second embodiment of the present invention and corresponding to that according to the above-described first embodiment shown in FIG. 4. Referring to FIG. 10, in a case where distance r (=DD) from the origin is in a range $0 \leq r \leq E_i$, a linear conversion into 0 to $E_f$ is performed (however, a maximum value of 8 bits: "255" can be realized when $E_f = \alpha DI$) and all of colors having r holding a relationship $E_i < r < F_i$ are converted into $E_f$.

Figure 8:
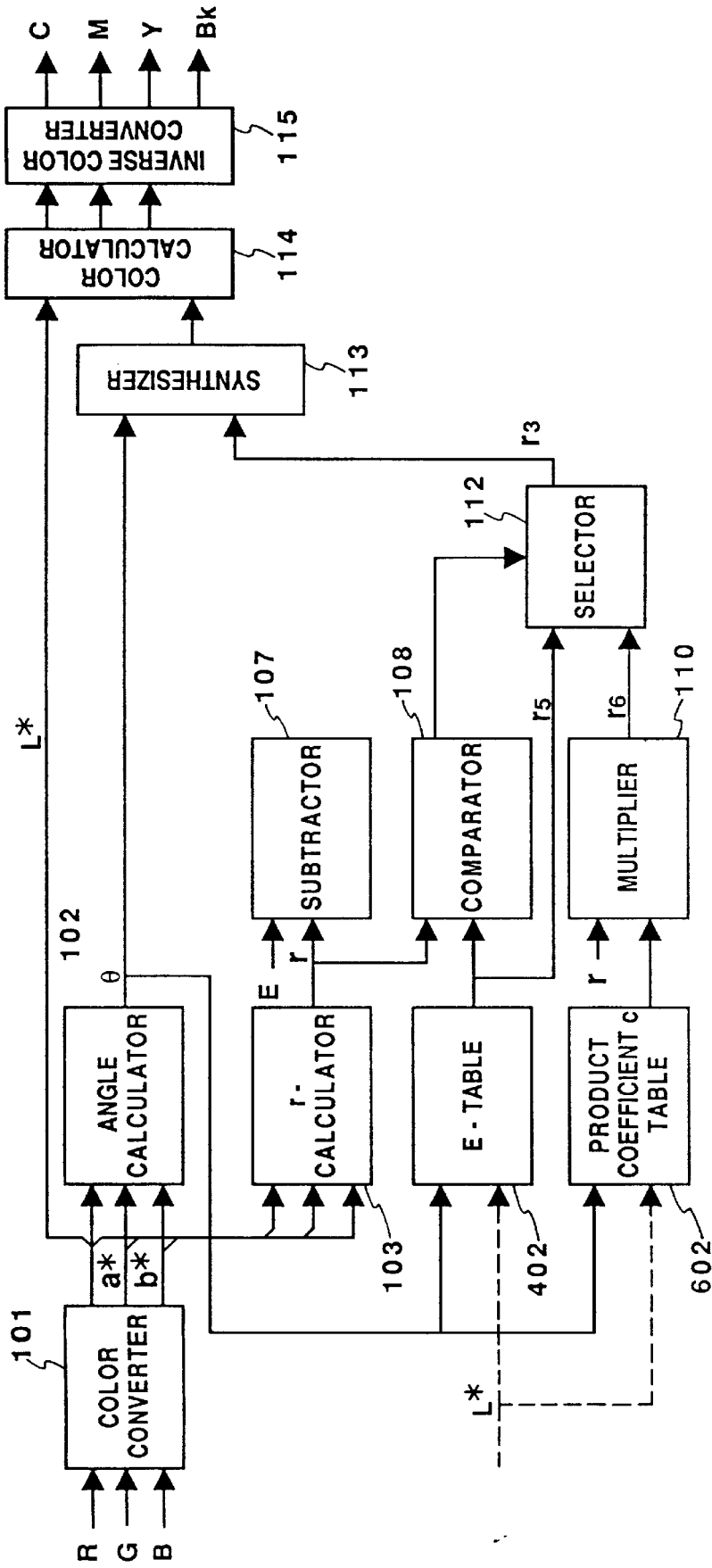
FIG. 8 is a block diagram which illustrates the structure of hardware according to the second embodiment of the present invention.

FIG. 8 illustrates the structure of hardware for realizing a color space compression and according to the second embodiment of the present invention. Referring to FIG. 8, the same elements as those according to the above-described first embodiment are given the same reference numerals and their descriptions are omitted here.

According to the second embodiment, an E-table 402 is used in place of the D-table 104. The E-table 402 stores table values shown in FIG. 5. If a result of $E\theta_i < r$ (DI<DD) is obtained in the comparator 108, output $r5 = E\theta_i$ (=DI) from the E-table 402 is selected by the selector 112 so as to be supplied to the synthesizer 113 (a relationship DN=DI is realized).

Output $\theta$ from the angle calculator 102 is supplied to a product c table 602 so that a product coefficient of the values of $L^*$ and $\theta$ are transmitted. The above-described product coefficient c table 602 has, similarly to the above-described product coefficient b table 106, tables for each $L^*$ and stores values of $E\theta_f/E\theta_i$ with respect to angle $\theta$ as tables ($E\theta_f/E\theta_i = \alpha$).

Therefore, the multiplier 110 subjects r (DD) obtained from the color of pixel data to a calculation $r6 = r \times E\theta_f/E\theta_i$ (=DD$\times\alpha$) so that data DN=$\alpha$DD after the color space compression has been performed is obtained. The comparator 108 controls the selector 112 when $E\theta_i \geq r$ (DI$\geq$DD) to transmit output r6 from the multiplier 110 as r3 (=r6). As a result, $\alpha$ (=constant) is a multiplication coefficient for effectively utilizing the overall dynamic range of the quantization bit number, that is, 8 bits (0 to 255).

FIG. 7 illustrates the color space compression according to a third embodiment of the present invention. According to this embodiment, a color space of the color reproducible region (a portion within the closed curve 201 of FIG. 2) of the CRT and including outer periphery F is linearly compressed into a portion (a portion within the closed curve 202 of FIG. 2) defined by the outermost periphery E of the color reproducible region of the color hard copy apparatus. That is, a linear compression of chromaticness arranged as DN=DD$\times$DI/DS is performed.

Figure 9:
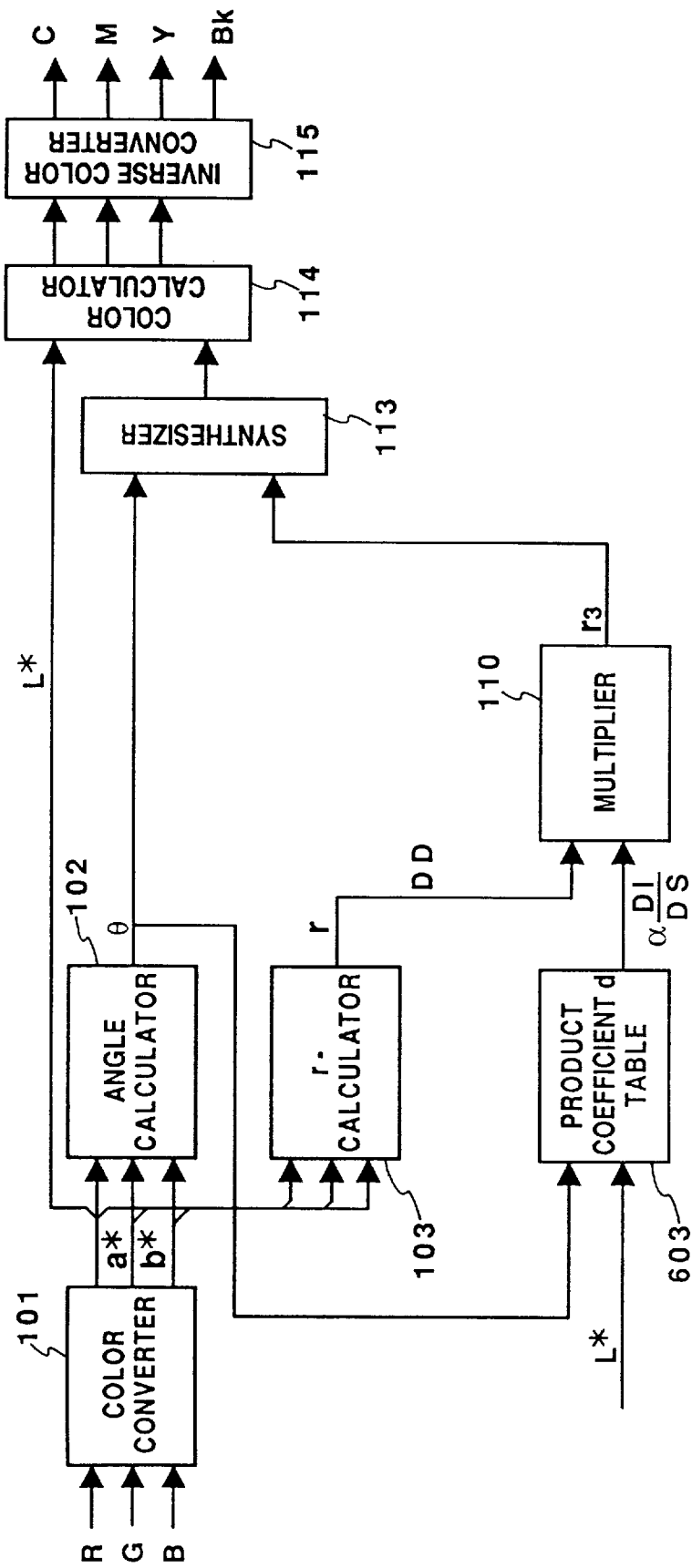
FIG. 9 is a block diagram which illustrates the structure of hardware according to the third embodiment of the present invention.

FIG. 9 is a block diagram which illustrates hardware of a third embodiment of the present invention for realizing the above-described color space compression.

Output r from the r calculator 103 is multiplied in a multiplier 110 so as to be supplied as data after the color space compression has been performed to the synthesizer 113. The output from the multiplier 110 converts to 8 bits (0 to 255) which is the color reproducible space of the printer when the overall color space is assumed to be 8 bits (0 to 255). The above-described conversion ratio is supplied from a product coefficient d table 603. The contents of the product coefficient d table 603 is $E\theta_f/F\theta_i$ when $E\theta_f$ and $F\theta_i$ shown in FIG. 10 are used, $E\theta_f/F\theta_i$ being the same as $\alpha$ times DI/DS of the principle. $E\theta_f$ and $F\theta_i$ are normalized so that the maximum value becomes 8 bits (255) in all of similar tables for all of $L^*$. Therefore, it is not probable that $E\theta_f$ and $F\theta_i$ are always "255" as shown in FIG. 10. It is also applied to a case shown in FIG. 4. The product coefficient d table 603 is provided for each $L^*$ and the contents of one table is read and determined in accordance with L* and angle θ (information about hue).

According to this embodiment, all of the portion to be color-space compressed are subjected to a compression performed in such a manner that the distance r (r corresponds to chromaticness) from the central position (the origin of the a* b* coordinate) of the color space is linearly converted. The present invention is not limited to this. Therefore, a method may be employed in which the degree of compression of the color space is made to be different (non-linear conversion) in accordance with the distance r (chromaticness). As an alternative to this, the degree of the compression and/or the degree of the non-linearity may be made different in accordance with angle θ (hue).

Furthermore, it can easily be analogized that the compression method and/or the degree of the non-linearity may be made different in accordance with component of L*.

Then, a description will be made about an example in which r (chromaticness or DD) is non-linearly compressed by using an exponential function and the compression ratio is made to be increased in proportion to the distance r from the center. The above-described relationship is expressed by an equation $DN = DD\{1-(1-DI/DS)^{DS/DD}\}$, where DD corresponds to r and DI and DS respectively correspond to $E\theta_i$ and $F\theta_i$. $E\theta_i$ and $F\theta_i$ shows the values of the F-table and the E-table shown in FIG. 5. $F_i$ and $E_i$ for each angle are written as data $F\theta_i$ and $E\theta_i$ for each angle θ and are prepared for each value of table L*.

Figure 11:
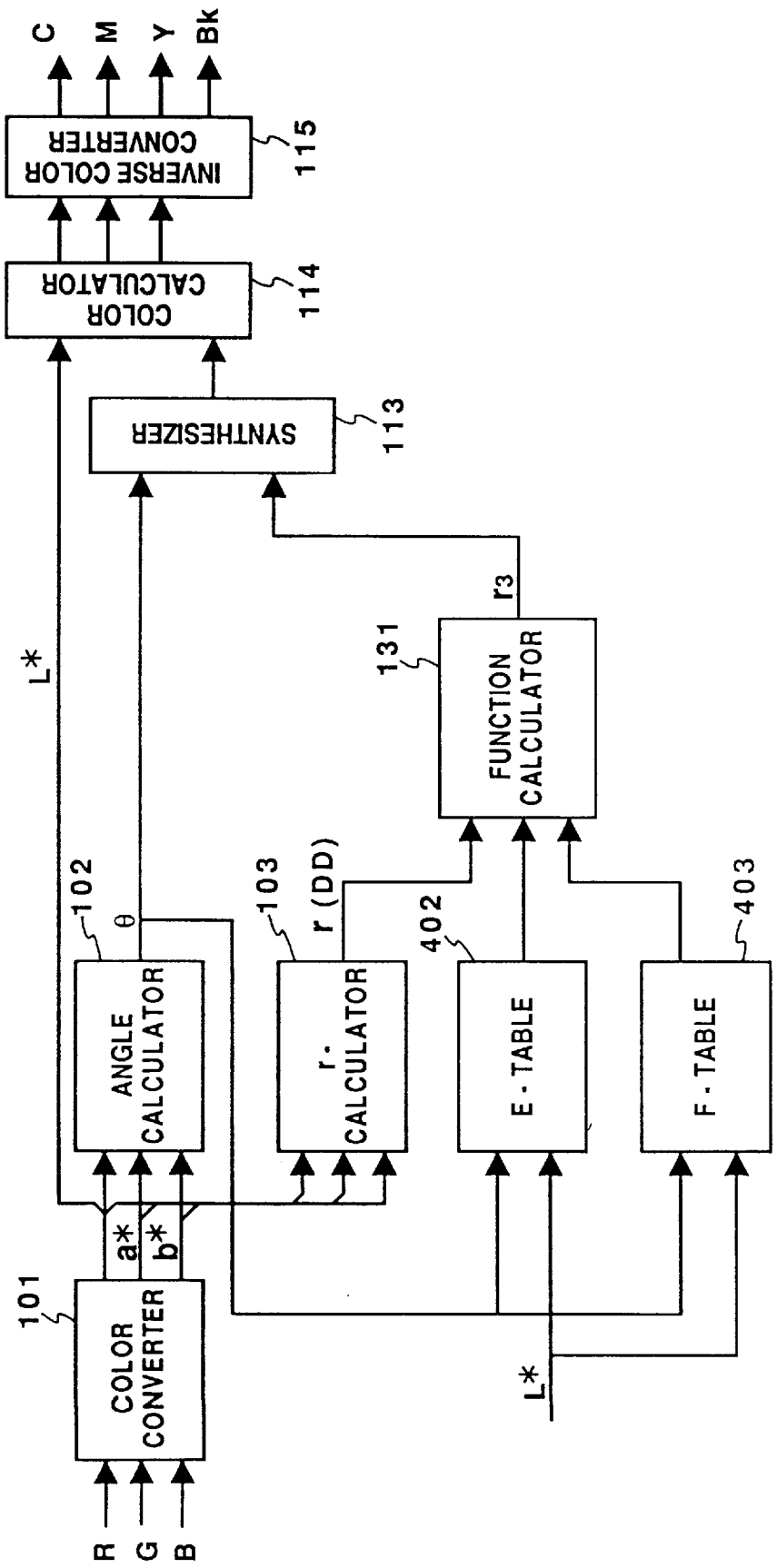
FIG. 11 is a block diagram which illustrates the structure of hardware according to a fourth embodiment of the present invention.

The structure of hardware capable of performing the color space compression in accordance with the above-described premise and according to a fourth embodiment of the present invention is shown in FIG. 11. FIG. 11 is a diagram which illustrates a structure which acts basically similarly to that according to the embodiment shown in FIG. 9.

A function calculator 131 performs the following calculation:

$$r3 = \alpha \times r\{(1-(1-E\theta_i/F\theta_i)^{F\theta_i/r})$$

Since $E\theta_i$ is written to E-table 402 and $F\theta_i$ is written to the F-table 403, each table is supplied with L* and angle θ so that $E\theta_i$ and $F\theta_i$ corresponding to L* and the hue (θ) are supplied to the function calculator 131. The function calculator 131 is further supplied with r and α so that the above-described function calculation is performed.

α is set in such a manner that the maximum value of the output from the function calculator 131 becomes "255" which is the full dynamic range of 8 bits with respect to all of the combinations of L*, θ and r. Therefore, the following relationship can be obtained from the function calculator 131:

$$DN = \alpha \times DD\{1-(1-DI/DS)^{DS/DD}\}$$

In accordance with this, it is converted into C, M, Y and Bk signals to be supplied to the hard copy apparatus by the synthesizer 113, the color calculator 114 and the inverse color converter 115.

Then, a fifth embodiment of the present invention will now be described with reference to the drawings.

Figure 15A:
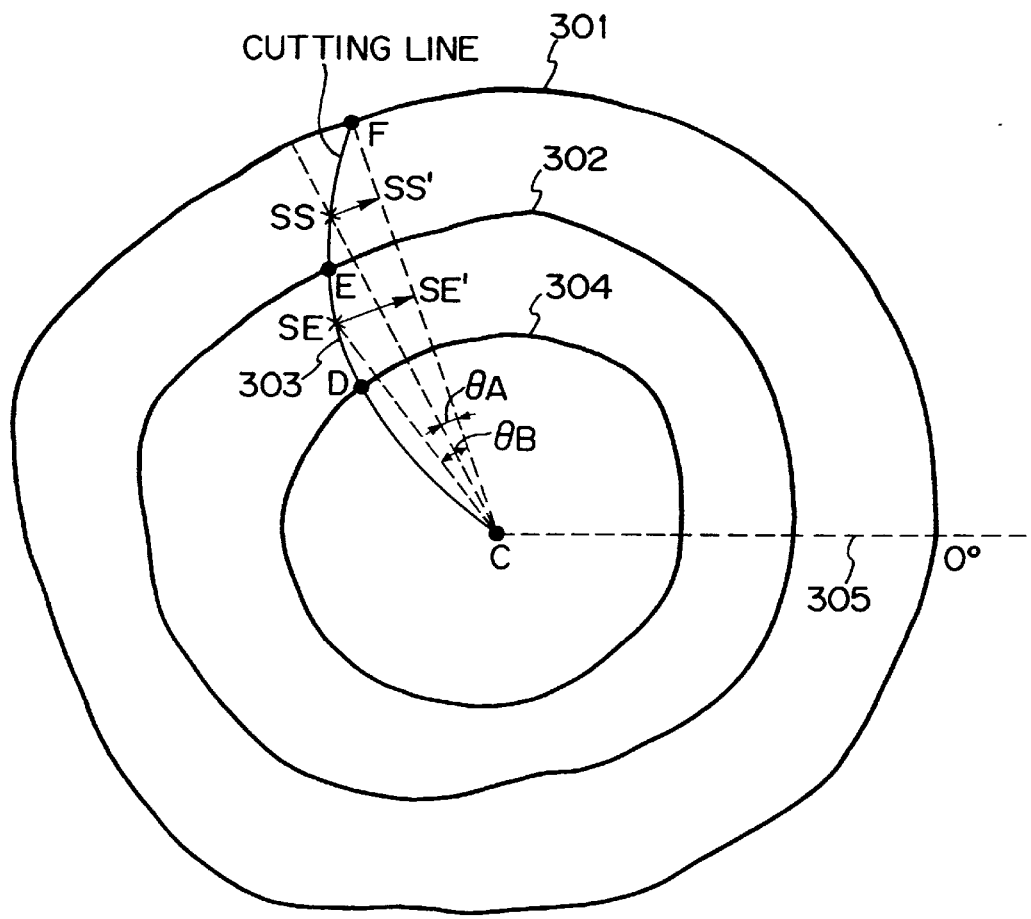
FIG. 15A illustrates a range of a color space according to a fifth embodiment of the present invention.

FIG. 15 illustrates a range of the color space relating to FIG. 2. Referring to FIG. 15A, a closed curve 301 including point F designates the outer periphery of all color space, while a closed curve 302 including point E designates the outer periphery of a color space in a range in which the printer is able to reproduce color. According to this embodiment, similarly to the above-described embodiment, the portion in the closed curve 301 including point F, that is, all color space (the closed curve 301) is space-compressed into the color space of the closed curve 302 including point E so as to improve the color reproducibility of the printer. According to this embodiment, FIG. 15A illustrates uniform perceptual color spaces such as L, a, b, Y, I, Q and the like. However, another color space may be employed. When the color space shown in FIG. 15A is cut by a cutting line 303, the status of compression of the color space at the cross section becomes similar to that shown in FIG. 3. Referring to the drawing, F denotes the outer periphery of all color space, E denotes the outer periphery in which the printer is able to reproduce color, D denotes the reproducible range in which the color deviation in the printer can be prevented and C denotes the center of the color space.

Color information included in a color space surrounded by a closed curve 304 passing through point D of all color space designated by the closed curve 301 (corresponding to F shown in FIG. 3) shown in FIG. 15A is reproduced by the printer as it is. In a case where color in a color space surrounded by the closed curves 304 and 301 is reproduced by the printer, it is compressed into a color space surrounded by the closed curve 302 so as to be reproduced by the printer. The conversion of the color space at this time is performed similarly to that shown in FIG. 4.

Figure 15B:
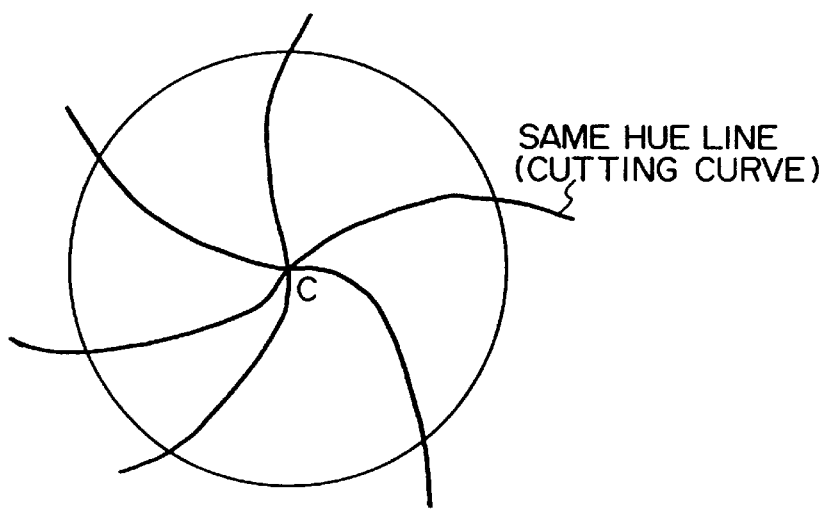
FIG. 15B illustrates a same hue line in a color space.

Furthermore, color on the line cut by the cutting line 303 shows the same color of the same hue as shown in FIG. 15B.

Since segment CDEF showing the cutting line 303 shown in FIG. 3 is a curve as shown in FIG.15A, the phase angles (called "hue") of points on the cutting line 303 with respect to a horizontal line 305 drawn from point C to the right are different by a small angular degrees. An assumption is made that the angle of the phase deviation from segment CF is $\theta_A$ at point SS and $\theta_B$ at point SE. Therefore, if the color at the position of point SS is compressed to the point of SE in the color space compression operation, it can be understand that the phase angle at this time may be enlarged by $(\theta_B - \theta_A)$ Assuming that the straight distance between C and SS is $r_{SS}$, that of C and SE is $r_{SE}$, the curved distance between C and SS is $R_{SS}$ and the curved distance between C and SE is $R_{SE}$, the ratio of $R_{SS}$ and $R_{SE}$ may be approximated to the ratio of $r_{SS}$ and $r_{SE}$, causing no problem to occur. Therefore, according to this embodiment, the coordinate in the color space is determined by using the straight distances $r_{SS}$ and $r_{SE}$ from point C to point SS and point SE.

FIG. 17 illustrates the data structure of a hue correction table (a hue correction table 1) in which data corresponding to the above-described phase angles $\theta_A$, $\theta_B$ and the like are written. That is, assuming that the difference of phase angle of point $P(r_n, \theta_n)$ from straight line CF, which point is defined by angle $\theta_n$ made from the horizontal line 305 shown in FIG. 15A and straight distance $r_n$ from central point C, is $\theta(r_n, \theta_n)$, distance $r_n$ with respect to each point and data (angle) showing the difference of phase angle θ which corresponds to distance $r_n$ are written in the table 121. For example, $\theta(r_1, 0)$ shows the difference of phase angle when the position $P(r_1, 0)$ on a cutting line defined by angle 0° made from the horizontal line 305 and straight distance $r_1$ from the central point C, moves to a point on a straight line of the angle 0° which corresponds to the point P.

Although omitted from illustration, a table (called a hue correction table 2) arranged similarly to that shown in FIG. 17 is provided in which data corresponding to angle $\theta_B$ when point SE' on straight line FC is returned to the same phase line of point SE on the curve 303 is written, the data being shown as $\theta'(r_n, \theta_n)$.

Therefore, the sequence of the color space compression is arranged in such a manner that $\theta_A$ is retrieved from the hue correction table 1 shown in FIG. 17 to imagine the position of point SS' on straight line CF from point SS on the cutting line 303. Then, from point SS' on straight line CF, point SE' on the same straight line is obtained by the distance compression. Then, in order to obtain point SE on the curve 303 from the above-described point SE', $\theta_B$ is retrieved from the hue correction table 2 so that the phase angle of point SE is obtained. As a result, point SE which is obtained by space-compressing point SS on the curve 303 can be obtained.

Figure 18A:
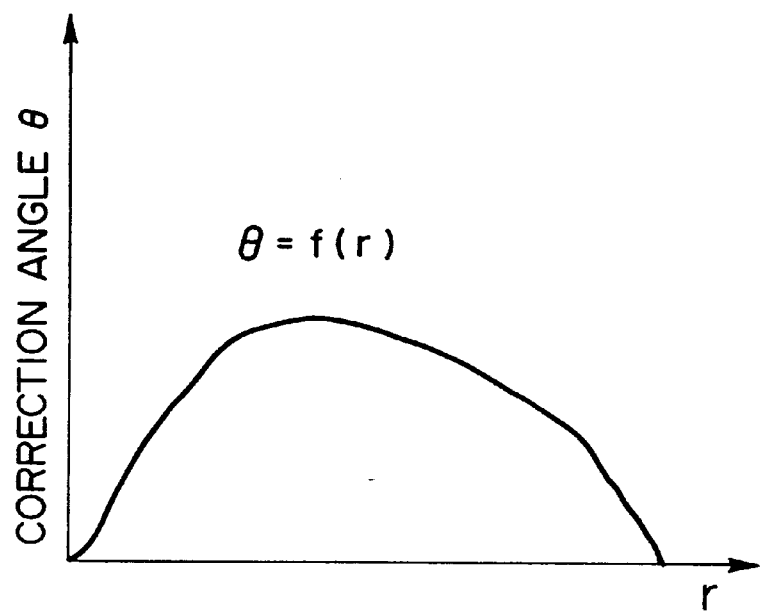
FIGS. 18A and 18B illustrate the relationship between distance r and phase angle θ.
Figure 18B:
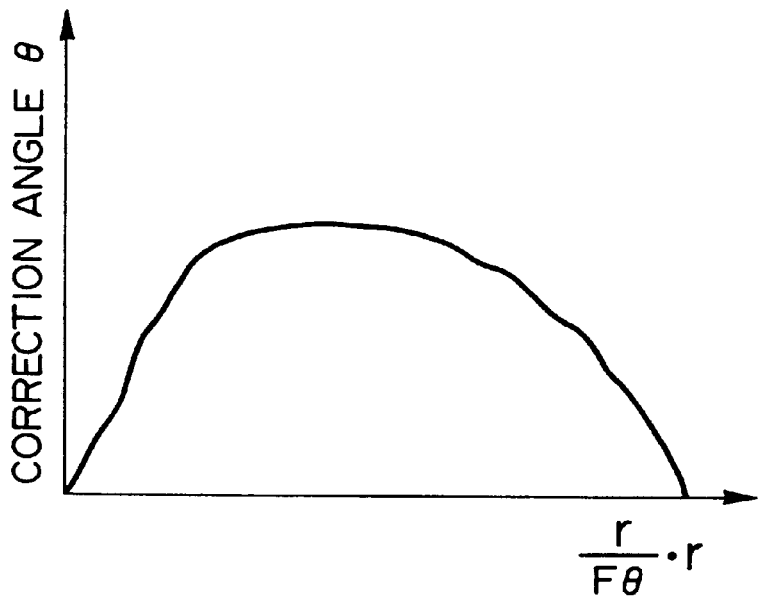

In order to reduce the quantity of data to be possessed by the above-described hue correction tables 1 and 2, it can easily be assumed that data may be possessed in rough units and data interpolated may be processed at the time of the operation (at the retrieval). As an alternative to storing the difference in the phase angle as data, a function for obtaining the difference in the above-described phase angle may be prepared. For example, a function showing the relationship between distance r and phase angle θ for each phase angle may be provided as shown in FIG. 18A. As an alternative to this, a function showing the relationship between distance r and phase angle θ may be provided for all of the phase angles to obtain the required value by calculations. FIG. 18B is arranged in such a manner that the axis of ordinate stands for the correction angle (θ) and the axis of abscissa stands for r/Fθ. Since Fθ designates the outermost periphery of the color space, the maximum value is "1" without exception regardless of the phase angle.

According to this embodiment, an example in which the above-described color correction tables 1 and 2 are employed will now be described.

Figure 19:
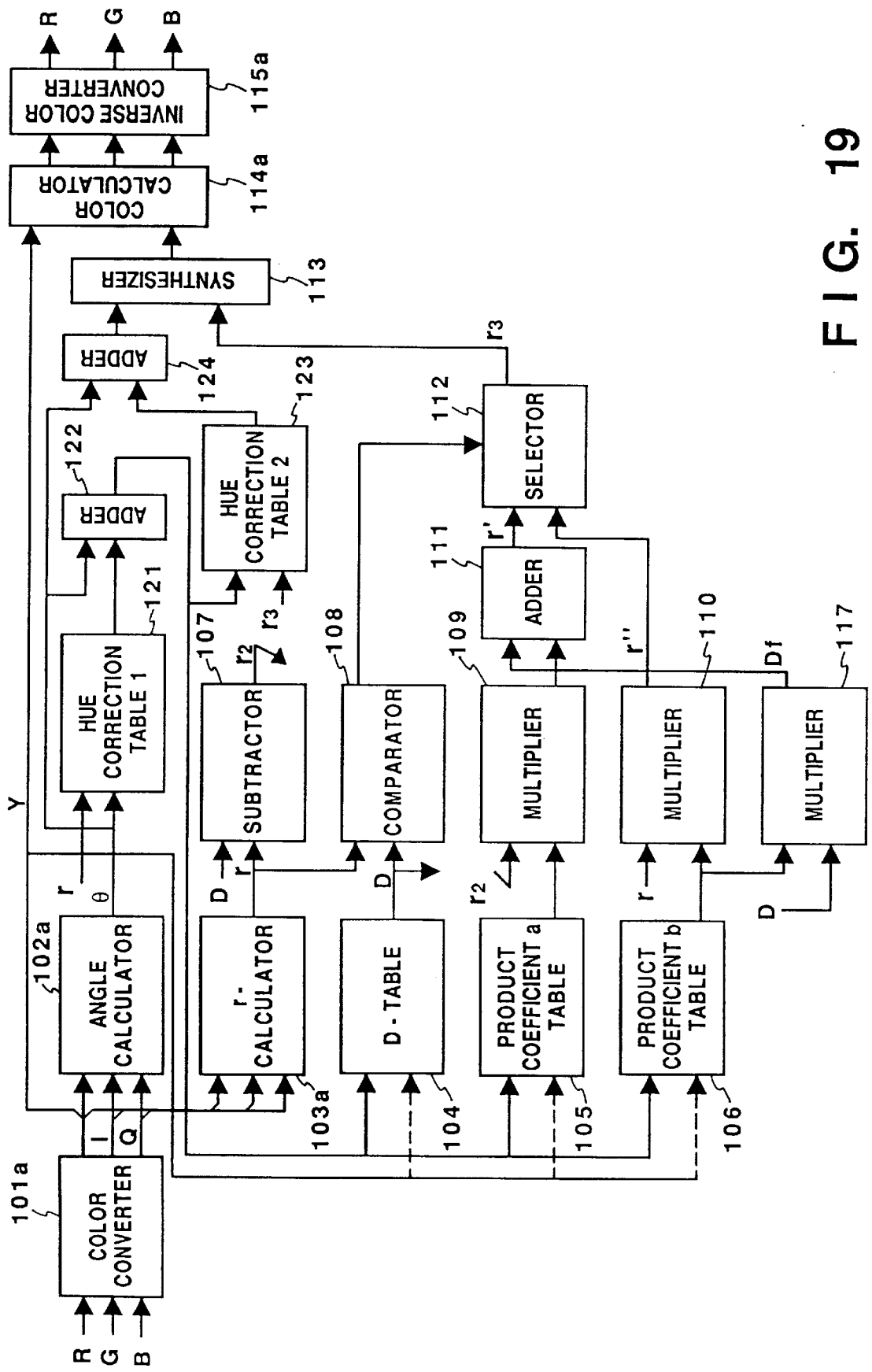
FIG. 19 is a block diagram which illustrates the structure of hardware according to a fifth embodiment of the present invention.

FIG. 19 is a block diagram which illustrates a fifth embodiment of the structure of an image conversion circuit for realizing the above-described color space compression and according to the present invention. Referring to Fig, 19, the same elements as those according to the above-described circuit portion are given the same reference numerals and their descriptions are omitted here.

Reference numeral 101a represents a color converter for converting image data for R, G and B into color spaces for Y, I and Q. Although image data for R, G and B can be converted into the L*a*b* space as described above so as to treat Y similar to L*, I similar to a* and Q similar to b*, its description is omitted here. Image data converted into color spaces Y, I and Q in the color converter 101a is supplied to an angle calculator 102a. The angle calculator 102a obtains angle θ which shows the angle of rotation of pixel data P of image data in the orthogonal coordinate systems I and Q from axis Q as shown in FIG. 16. The angle θ can be obtained by using any one of the following equations assuming that the coordinate of pixel data P (I, Q) is (i, q):

$\tan^{-1}(i/q)(q\neq 0)$ or $\sin^{-1}(i/(i^2+q^2)^{1/2})$ $\cos^{-1}(q/(i^2+q^2)^{1/2})[(i^2+q^2)^{1/2}\neq 0]$ The output from the color converter 101a is also supplied to an r-calculator 103a in which $r=(i^2+q^2)^{1/2}$ is calculated and well as the distance from the center C of the color space is calculated. As a result, the coordinate (r, θ) of pixel data P of the polar coordinate system can be obtained. It can be also expressed as (i, q)=(rsin θ, rcos θ) in the orthogonal coordinate system.

Output θ from the angle calculator 102a is supplied to a color correction table 1 (121) so that the difference in the phase angle from a point on the cutting curve 303 to straight line CF is obtained. The difference thus-obtained and angle θ obtained in the angle calculator 102a are added to each other by an adder 122 so that the position of a point on the cutting line 303 is converted into a position on straight line CF. The phase angle difference thus-converted is supplied to the D-table 104, the product coefficient a table 105 and the product coefficient b table 106. The output from the adder 122 is supplied to the hue correction table 2 (123). With the correction table 2 (123), the angle for converting the coordinate of the point on straight line CF into the point on the cutting curve 303 is obtained. Furthermore, the point on straight line CF is, by an adder 124, returned to the point on the curve 303. Since r3, which is the output from a selector to be described later, is supplied to the correction table 2 (123), the point which has been distance-compressed on straight line CF can be converted into a point on the curve 303.

Values $F_i$, $E_i$ and $D_i$ of the all color space shown in FIG. 4 are varied depending upon the angle θ and as well as the color reproducible ranges $E_f$ and $D_f$ of the printer are varied depending upon angle θ. The colors in the actual all color space for each angel θ are shown by $D_i$, $E_i$ and $F_i$ shown in FIG. 5, the description of which is omitted here.

Output r from the r-calculator 103a is supplied to the comparator 108 and also supplied to the subtractor 107 so that $r2=r-D\theta_i$ is calculated, where $D\theta_i$ is data supplied from the D-table 104 and which shows $D_i$ with respect to angle θ. The result of the calculation, that is, r2 ($=r-D\theta_i$) is further supplied to a multiplier 109 so as to be multiplied with the output from the product coefficient a table 105. The output from the multiplier 109 is added to the output from the multiplier 117 in the adder 111.

Output $D\theta_i$ from the D-table 104 and output $D\theta_f/D\theta_i$ from the product coefficient b table 106 are supplied to the multiplier 117 and $D\theta_f$, which is the result of the calculation, is output. Thus, the output from the adder 111 becomes P (r', θ) which the color space of pixel data P (r, θ) is compressed in a case where r of P (r, θ) holds a relationship $F\theta_i \geq r \geq D_i$.

On the other hand, the output from the product coefficient b table 106 is supplied to a multiplier 110 in which it is multiplied with r of pixel data P (r, θ). As a result, r" of pixel data P (r", θ) can be obtained after the color space compression has been performed in a case where $D\theta_i \geq r$. The thus-obtained r' and r" are supplied to the selector 112 so that either one of the two is selected. As a result, it is output as r3. We now describe about a selection signal for determining the output from the selector 112. The output r from the r-calculator 103a is supplied to the comparator 108 in which whether or not $D\theta_i \geq r$ is determined. The result of this comparison is supplied as the selection signal of the selector 112. As a result, a selection is made in such a manner that the output r3 from the selector 112 is r" in a case where $D\theta_i \geq r$ and r3=r' in the other cases.

The final phase after the color space compression has been performed is determined by data r3 after the color space compression and the phase obtained by the hue correction table 2 (123) and the adder 124, then they are made to be one data item as (r3, θ).by the synthesizer 113. The color calculator 14a obtains I=r3·sin θ, Q=r3·cos θ from P (r3, θ) and as well as receives Y data from the color converter 101a. Data for Y, I and Q thus-obtained are converted from Y, I and Q into R, G and B signals by the inverse color converter 115a.

The conversion of R, G, B, Y, I and Q performed in the color converter 101a and the inverse color converter 115a are linear one dimensional transformation which can be expressed by the following matrix calculation:

$$\begin{vmatrix} Y \\ I \\ Q \end{vmatrix} = \begin{vmatrix} a11 & a12 & a13 \\ a21 & a22 & a23 \\ a31 & a32 & a33 \end{vmatrix} \times \begin{vmatrix} R \\ G \\ B \end{vmatrix}$$

$$\begin{vmatrix} R \\ G \\ B \end{vmatrix} = \begin{vmatrix} a11 & a12 & a13 \\ a21 & a22 & a23 \\ a31 & a32 & a33 \end{vmatrix} \times \begin{vmatrix} Y \\ I \\ Q \end{vmatrix}$$

The above-described calculation can be performed by a sum and products calculation by using a multiplier and an adder. Furthermore, a method in which a part of the above-described sum and the products operation is replaced by a ROM table is well known.

Since the I and Q space widths are changed in response to the brightness signal Y as designated, it is preferable that a plurality of tables, that is, the D-table 104, the product coefficient a table 105 and the product coefficient b table 106 are input Y signal shown as dot lines in FIG. 19, and switched over in accordance with the value of the brightness signal Y to change the output values from them.

Figure 20:
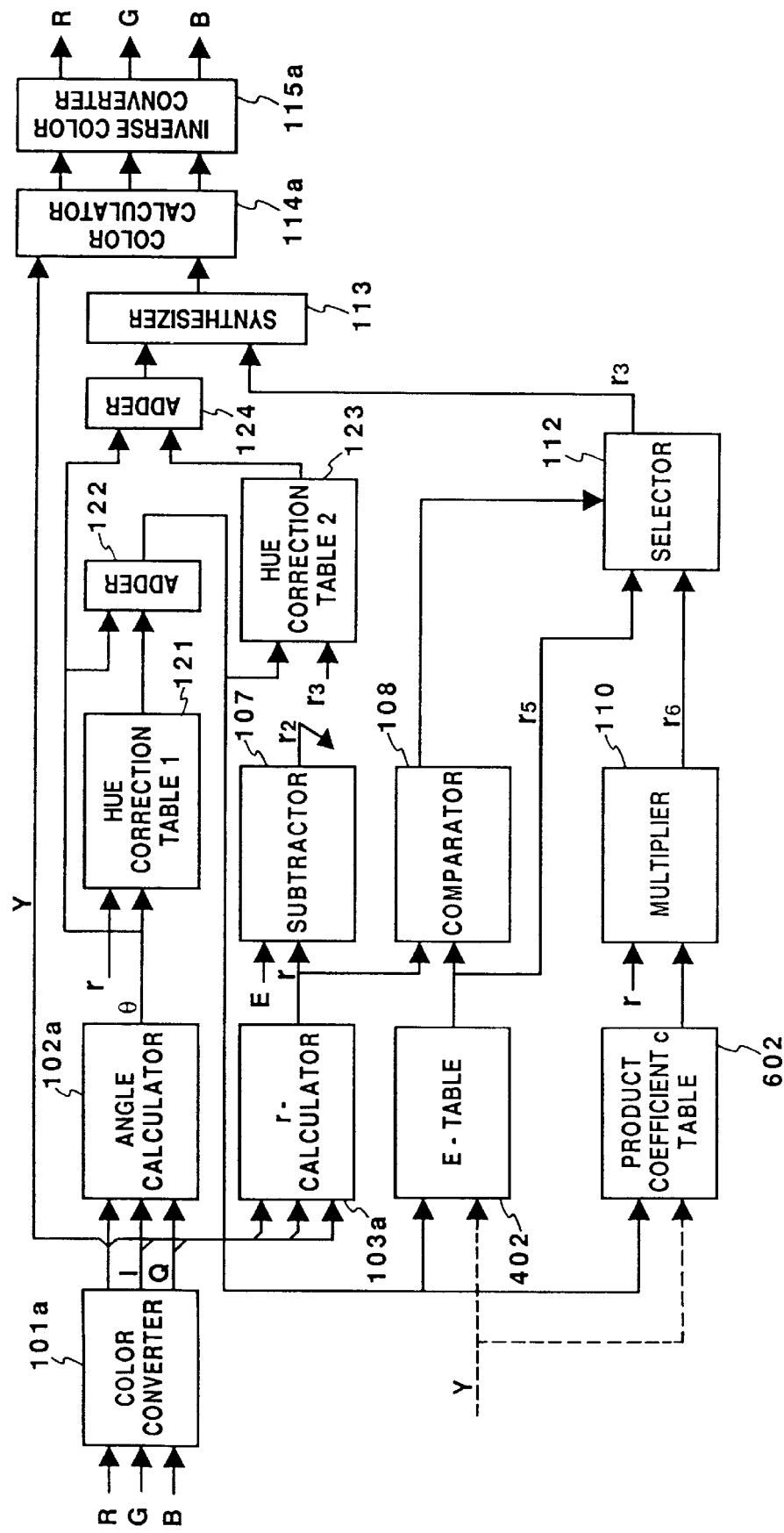
FIG. 20 is a block diagram which illustrates the structure of hardware according to a sixth embodiment of the present invention.

FIG. 20 is a block diagram which illustrates a sixth embodiment of the image processing circuit of the present invention and capable of realizing the above-described color space compression as shown in FIG. 6. Referring to FIG. 20, the same elements as those according to the above-described embodiments are given the same reference numerals and their descriptions are omitted here.

According to this embodiment, the E-table 402 is used in place of the D-table 104. The E-table 402 stores the above-described data shown in FIG. 5. If the comparator 108 determines r of P (r, q) has a relationship $E\theta_i < r$, output $r5 = E\theta_i$ from the E-table 402 is selected by the selector 112 so as to be supplied to the synthesizer 113.

Output θ from the angle calculator 102 is used to obtain the angle of Fθ by the hue correction table 1 (121) and the adder 122, and the output of the adder 122 is supplied to the product c table 602 so that a product coefficient is obtained with respect to Y and θ. The above-described product coefficient is output as a value of $E\theta_f / E\theta_i$ with respect to angle θ and those values are stored as a table with respect to each angle θ. As an alternative to this, another table may be possessed in accordance with brightness signal Y.

Therefore, the multiplier 110 subjects pixel data P (r, θ) to a calculation $r6 = r \times E\theta_f / E\theta_i$ so that data after the color space compression has been performed is obtained. Therefore, in a case where $E\theta_i \geq r$, the result of the comparator 108 controls the selector 112 so that output r6 from the multiplier 110 as r3=r6.

Figure 21:
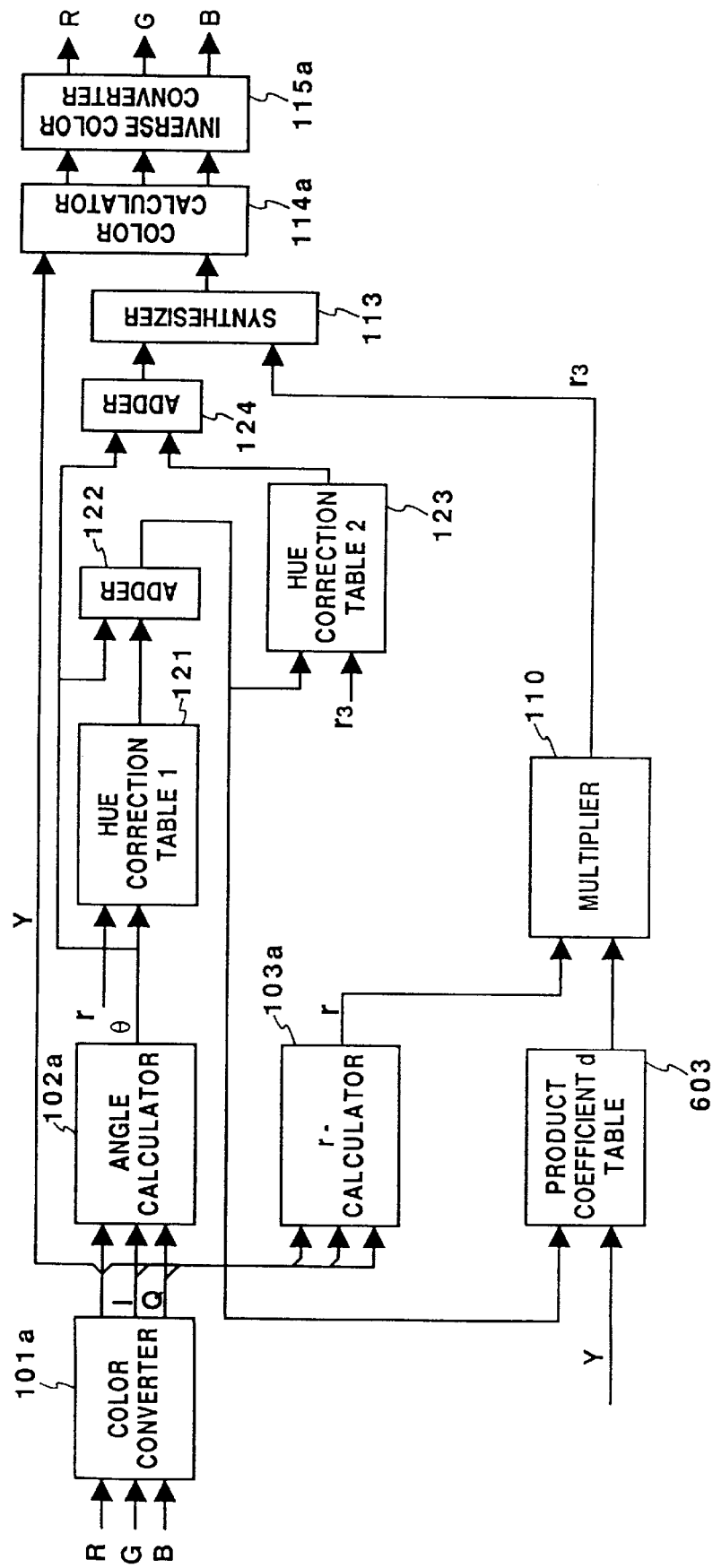
FIG. 21 is a block diagram which illustrates the structure of hardware for color-converting as shown in FIG. 7 after performing a hue correction according to the present invention.

FIG. 21 is a block diagram which illustrates the structure of the image processing circuit for performing the above-described color space compression shown in FIG. 7.

The output from the r-calculator 103 is multiplied in the multiplier 110 so as to be supplied as data after the color space compression has been performed to the synthesizer 113. When the overall color space is assumed to be 8 bits (0 to 255), the output r3 from the multiplier 110 serves as a conversion ratio to convert to 8 bits (0 to 255) which is the color reproducible space of the printer. The conversion ratio is supplied from the product coefficient d table 603. The contents of the product coefficient d table 603 are $E\theta_f / F\theta_i$ when $E\theta_f$ and $F\theta_i$ shown in FIG. 10 are used. The product coefficient d table 603 may be possessed for each brightness signal Y. Thus, the contents of one table is read out by information Y and θ so as to be determined. The probable values probable for $E\theta_f$ and $F\theta_i$ are "255" in maximum and less than "255" with respect to angle information θ or brightness information Y.

According to the embodiments of the present invention, all of the portion to be color-space compressed are subjected to a uniform compression performed in proportional to the distance from the central position of the color space. The present invention is not limited to this. Therefore, a method may be employed in which the color difference in the color space compression is made to be different in accordance with the distance r from the central position. As an alternative to this, the degree of the compression may be made different in accordance with angle θ. As for the brightness component Y, the degree of compression may be made different because all color space is different depending upon Y.

Referring to FIG. 15, the ratio of segment CE and segment CD may be made constant in the closed curve including point D around point C. Another arrangement may be employed in which segment CD is always constant and the closed curve including D is made to be a circle around point C.

As described above, according to this embodiment, the color of the major part of the color reproducible range of a printer or the like can be reliably reproduced while a part of the color reproducible range is processed in such a manner that it is made to be a compressed space of the all color space so that printer satisfactorily reproduces colors and can record/reproduce colors deviated from the color reproducible range while maintaining continuity.

According to this embodiment, the color of all of the color reproducible ranges of the printer can be reliably reproduced and colors deviated from the reproduction range is approximated to the outer periphery of the color reproducible range of the printer or the whole of the color space can be compressed into the color reproducible range of the printer. Furthermore, since the color space compression can be performed on the same hue line, the undesirable slight deviation in the hue can be prevented by the above-described color space compression.

Then, a seventh embodiment of the present invention will now be described with reference to FIG. 22 and ensuing drawings.

Figure 22B:
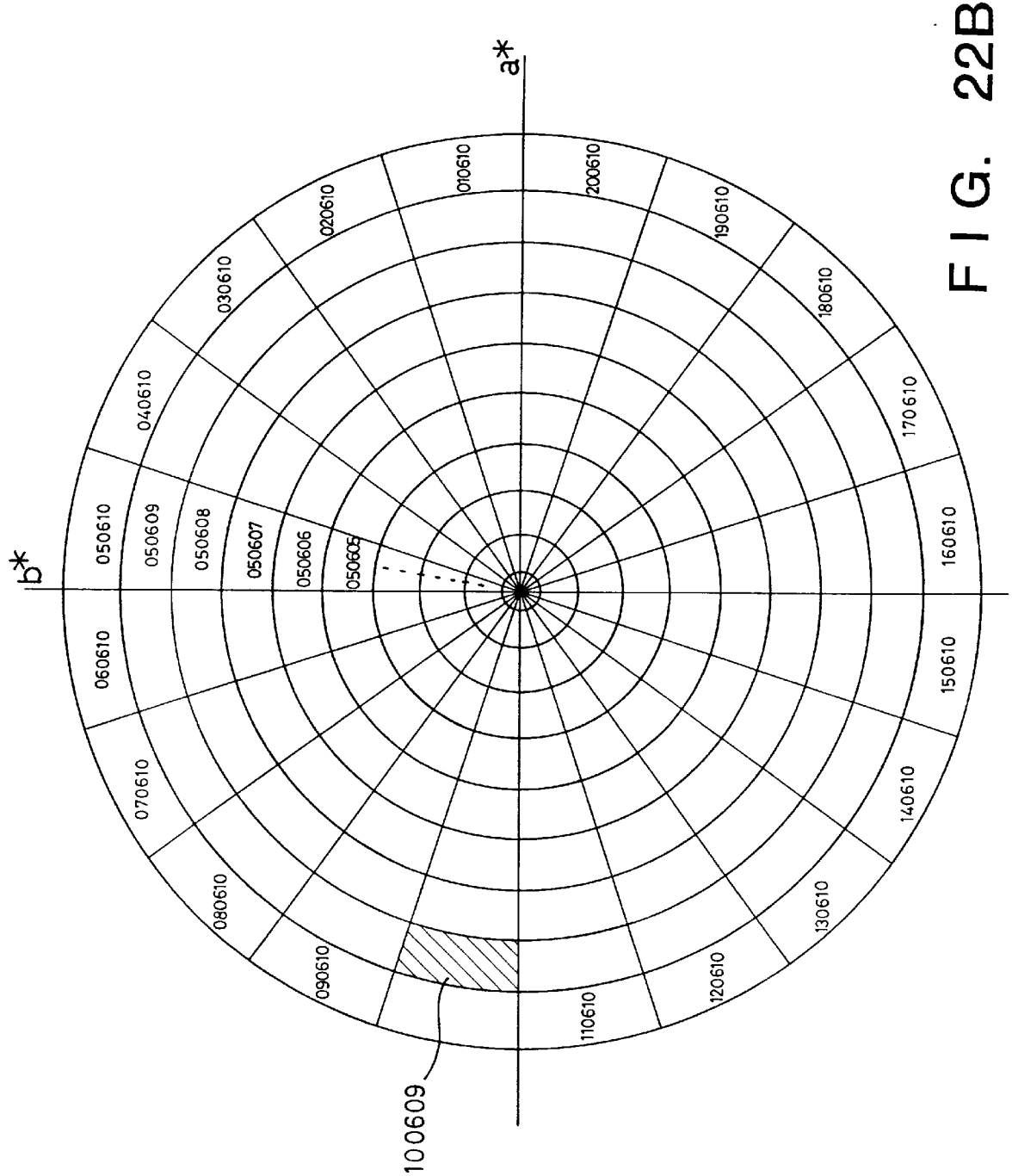

First, a method of storing the color reproducible range according to this embodiment will now be described with reference to FIGS. 22A and 22B. As shown in FIG. 22A, a uniform color space serving as a reference is sectioned into several degrees in terms of the hue, the brightness and the chromaticness in respective directions so as to store the portions corresponding to the color reproducible range as a set of small blocks.

According to this embodiment, the reference uniform color space is expressed by L* a* b* color space of the CIE standard and 6 digits standard code numbers are given to each of the blocks. FIG. 22B illustrates an example of the example of this, where the hue is sectioned into 20 steps and the chromaticness and the brightness are respectively sectioned into 10 steps.

FIG. 22B illustrates a plane of a color reproducible range (the brightness step=6) of a device the brightness of which is constant. Each code shown in FIG. 22B possesses information of two digits about, in this sequential order, the hue, the brightness and the chromaticness in the reference uniform color space. The hue is numbered counterclockwise with reference to the positive side of a*-axis, while the brightness and the chromaticness are respectively numbered in a direction from the small value toward the large value.

For example, code "100609" shown in FIG. 22B denotes substantially green in which the stage of the hue is "10", that of the brightness is "16" and that of the chromaticness is "9". If the above-described method is applied to each device, the number of blocks showing the color reproducible range to be stored corresponding to each device becomes different because each display and printer has different color reproducible ranges. However, the color designated by the same code number is the same color even if the machine type is different.

When the sectioning interval shown in FIG. 22 is narrowed, color information exhibiting excellent accuracy can be stored, while the accuracy is deteriorated if the interval is widened. The interval of the sectioning, the number of the digits and the reference color space, of course are not limited to the description about this embodiment.

Figure 23:
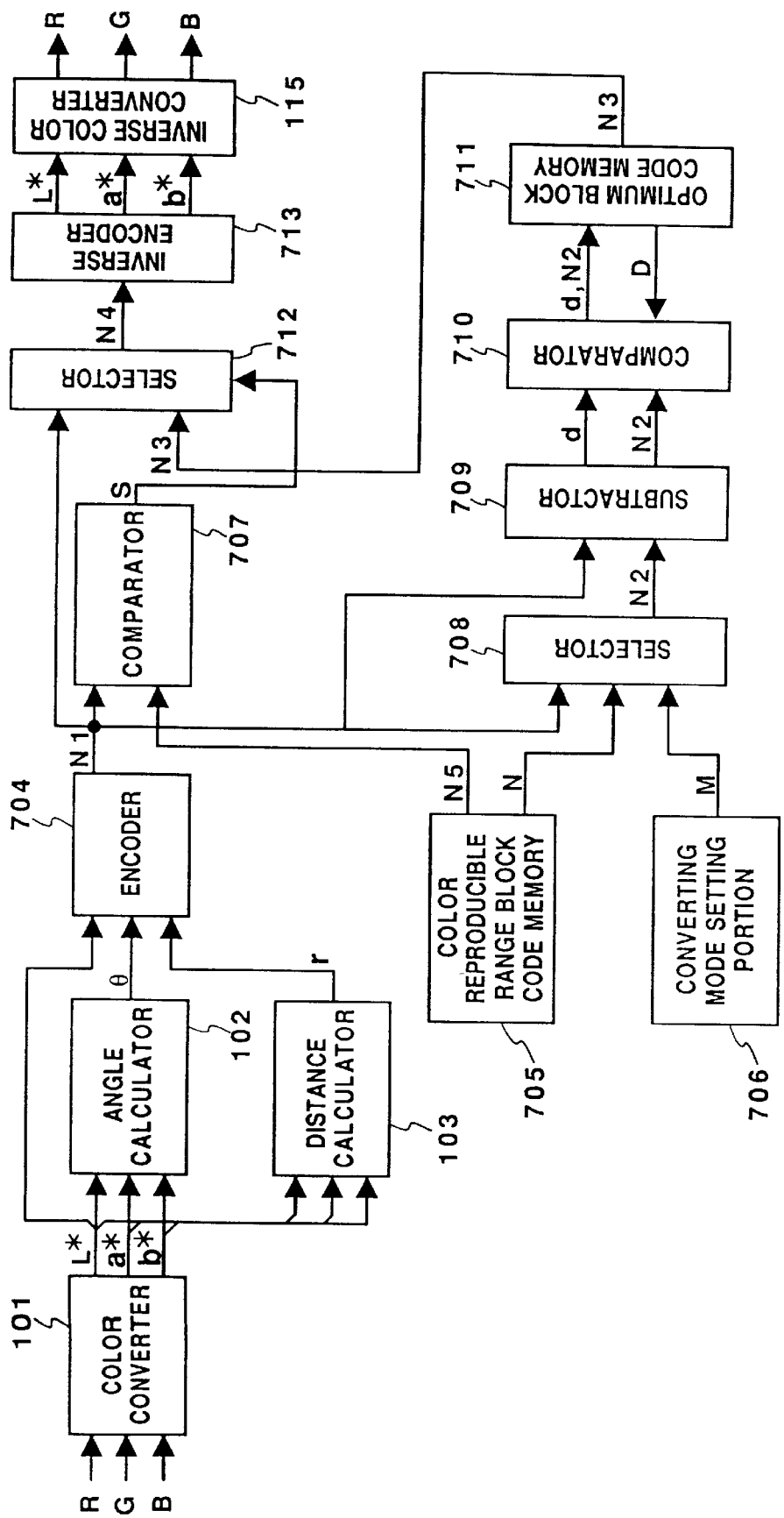
FIG. 23 is a block diagram which illustrates the structure of hardware according to a seventh embodiment of the present invention.

FIG. 23 illustrates a schematic structure for realizing the color image processing apparatus for performing the color space conversion according to the seventh embodiment, where the same elements as those shown in the aforesaid drawings are given the same reference numerals.

Figure 24:
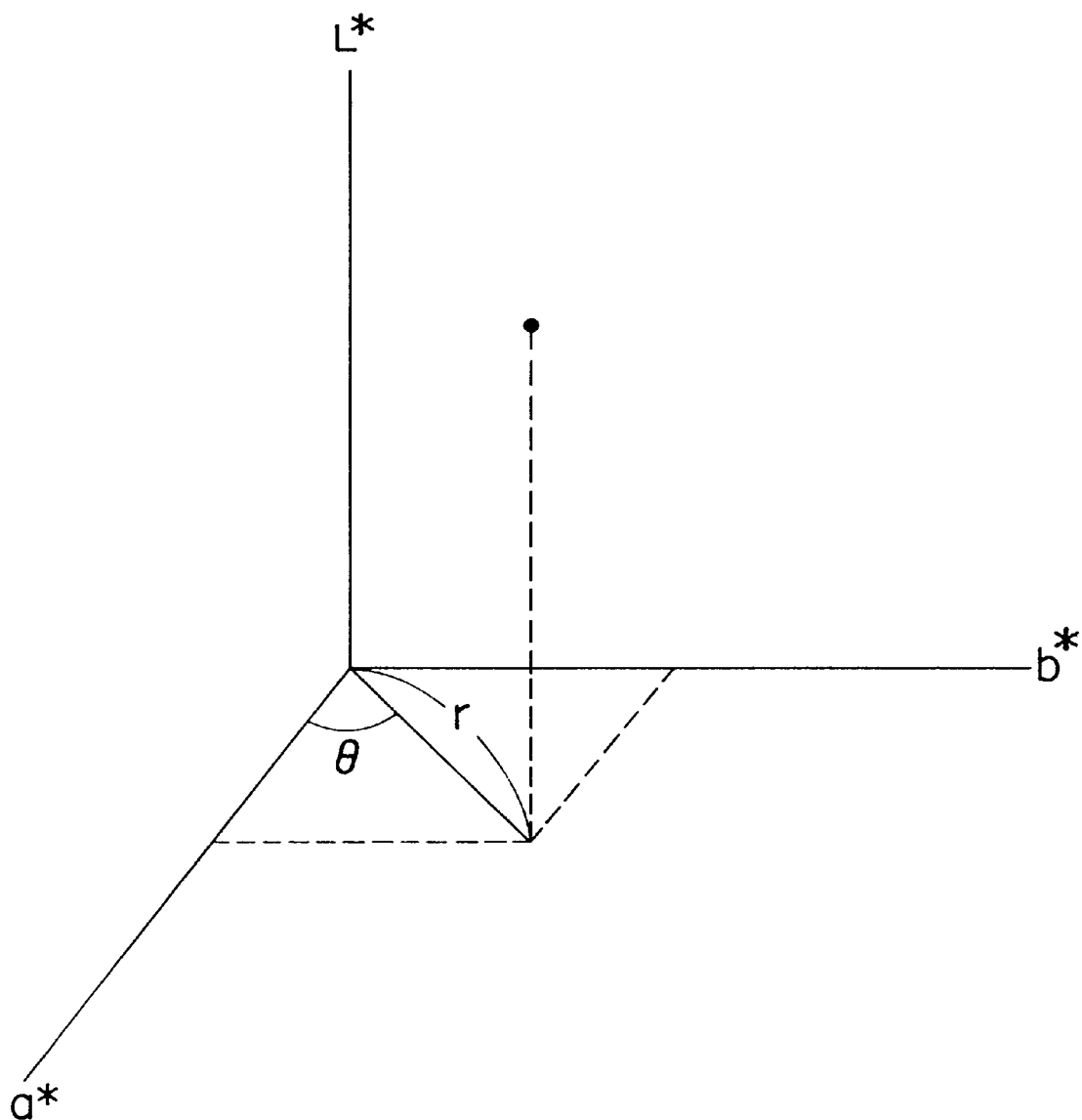
FIG. 24 illustrates the relationship between distance r and phase angle θ in an L* a* b* space.

R, G and B signals of received original information are converted into an L* a* b* signal by the color converter 101. The angle calculator 102 calculates angle θ made counter-clockwise from the positive side of the a*-axis and the r-calculator 103 calculate the distance r from L*-axis (see FIG. 24).

In this state, θ is obtained by a method similar to that according to the first embodiment (see FIG. 1). Furthermore, distance r from the L*-axis is obtained by $\sqrt{a^{*2}+b^{*2}}$.

Angle θ and distances r and L* are converted into two-digit information in the encoder 704 because θ has information about the hue, L* has information about the brightness and r has information about the chromaticness so that they are made to be block code N 1 of 6 digits. A color reproducible range block memory 705 stores all block codes of the color reproducible range block of the device (a so-called look up table is formed). Then, block code N5 of the outermost periphery of the same hue and the same brightness as those of block code N 1 supplied from the encoder 704 is read from the color reproducible range block code memory 705 so as to be subjected to a comparison with block code N 1 in a comparator 707. As a result, it is discriminated whether or not the received color signal is within the color reproducible range. Output S from the comparator 707 causes a selector 712 to select block code N1 if the block code N1 is within the color reproducible range and select block code N3 if the block code N1 is deviated from the color reproducible range.

In a case where the block code N1 is within the color reproducible range, block code N1 (=N4) is selected by the selector 712. Then, an inverse encoder 713 converts block code N4 into L* a* b* signal, these signals are converted into an RGB signal by an inverse color converter 115. The inverse encode operation to be performed in the inverse encoder 713 is carried out in accordance with a*=r cosθ, b*=r sinθ. The conversions respectively performed in the color converter 101 and the inverse color converter 115 can be realized by using XYZ according to CIE as follows:

| one-dimensional conversion | | non-linear conversion | | |
|---|---|---|---|---|
| RGB | ⇌ | XYZ | ⇌ | L* a* b* |

As an alternative to this, the calculation of the non-linear portion may be replaced by a ROM (table memory).

Then, a case where block code N 1 output from the encoder 704 is deviated from the color reproducible range of the device will now be described.

Block code group N read from the color reproducible range block code memory 705 is defined by block code N1 and mode M set in a conversion mode setting portion 706. Then, one block code N2 of the block code group N is selected by a selector 708 so as to be output. Although mode M to be set in the conversion mode setting portion 706 will be described later, it is, in brief, data showing the reference for selecting block code N2.

Block code N2 selected by the selector 708 is then supplied to a subtractor 709 so that difference d in the code No. between block code N1 and N2 is obtained. Since the block code denotes the position on the color space as described above, when the absolute value of difference d is small, the distance between blocks denoted by block codes N1 and N2 is short and the color difference is small. The subtractor 709 outputs difference d between block codes N1 and N2, and outputs block code N2.

A comparator 710 compares optimum absolute value D stored in an optimum block code memory 711 and difference d obtained from the subtractor 709. If it is discriminated that d<D, difference d and the value of block code N2 are stored in the optimum block code memory 711. The optimum block code memory 711 stores supplied difference d as optimum absolute value D so as to prepare for the next process. Although the sequence of description is inverted, the optimum block code memory 711 stores a sufficiently large value as the optimum absolute value D as the initial value whenever one optimum block has been determined. Therefore, a discrimination d<D is necessarily made in the first operation in the comparator 710, difference d is, as the optimum absolute value D, stored and block code N2 is stored in the optimum block code memory 711.

Then, the selector 708 outputs the second block code N2 of block code group N. Similarly, the subtractor 709 obtains difference d from block code N1. The result of this is supplied to a comparator 710. The comparator 710 causes the optimum block code memory 711 to store difference d and block code N2 at this time only when it discriminates that d<D.

By repeating the above-described operations, the optimum block code memory 711 stores block code N3 of a block positioned at the shortest distance from the block of block code N1 of block code group N defined by conversion mode M.

Block code N3 thus-obtained passes through the selector 712 (N3 is selected by the comparator 707) before it is converted into an RGB signal after via the inverse encoder 713 and the inverse color converter 115.

As described above, even if the supplied color signal is deviated from the color reproducible range of the device, it can be converted into the optimum color in accordance with the present mode.

Although the description is made about a case in which one color signal is converted, a case in which a plurality of color signals are supplied is processed by repeating the above-described operations.

Then, mode M to be transmitted from the conversion mode setting portion 706 and the conversion of the color reproducible range according to this embodiment will now be described with reference to FIG. 25. The conversion mode setting portion 706 according this embodiment set the following three kinds of modes:

Mode 1: the hue is made to be the same as hue of original information

Mode 2: the brightness is made to be the same as brightness of original information Mode 3: the chromaticness is made to be the same as chromaticness of original information Then, the description will be made about the case of mode 1. FIG. 25 is a cross sectional view of a certain hue (block code: 01XXXX). Referring to FIG. 25, a portion surrounded by a short dash line is a block showing the theoretical color reproducible range, while a portion surrounded by a continuous line is a block showing the specific color reproducible range for the device.

Figure 25:
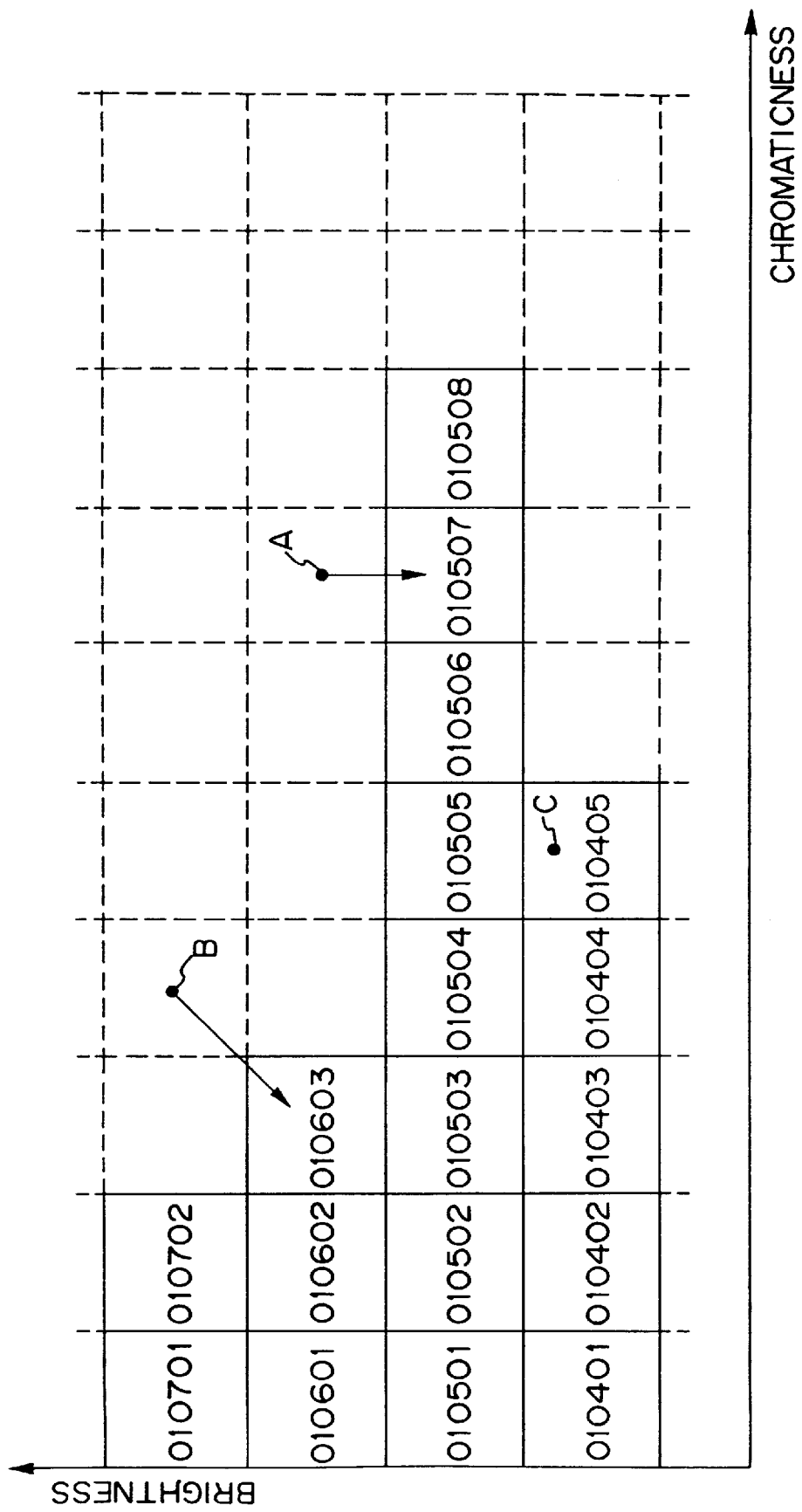
FIG. 25 illustrates a color conversion method according to a seventh embodiment of the present invention.

According to this embodiment, if, for example, color A and color B are supplied in the case of mode 1, block code group N of "010401" to "010702" shown in FIG. 25 are selected. As a result, a subtraction and a comparison are sequentially performed so as to obtain a block which approximates color A and color B. As a result, color A is converted as color designated by block code "010507", while color B is converted as color designated by block code "010603". Thus, an accurate conversion of original information is performed within the range of the set mode. In a case where color C is supplied, it is within the color reproducible range of the device. Therefore, conversion is not performed because the block code is "010405" and thereby original information is maintained.

Another embodiment of the present invention will now be described.

Figure 26:
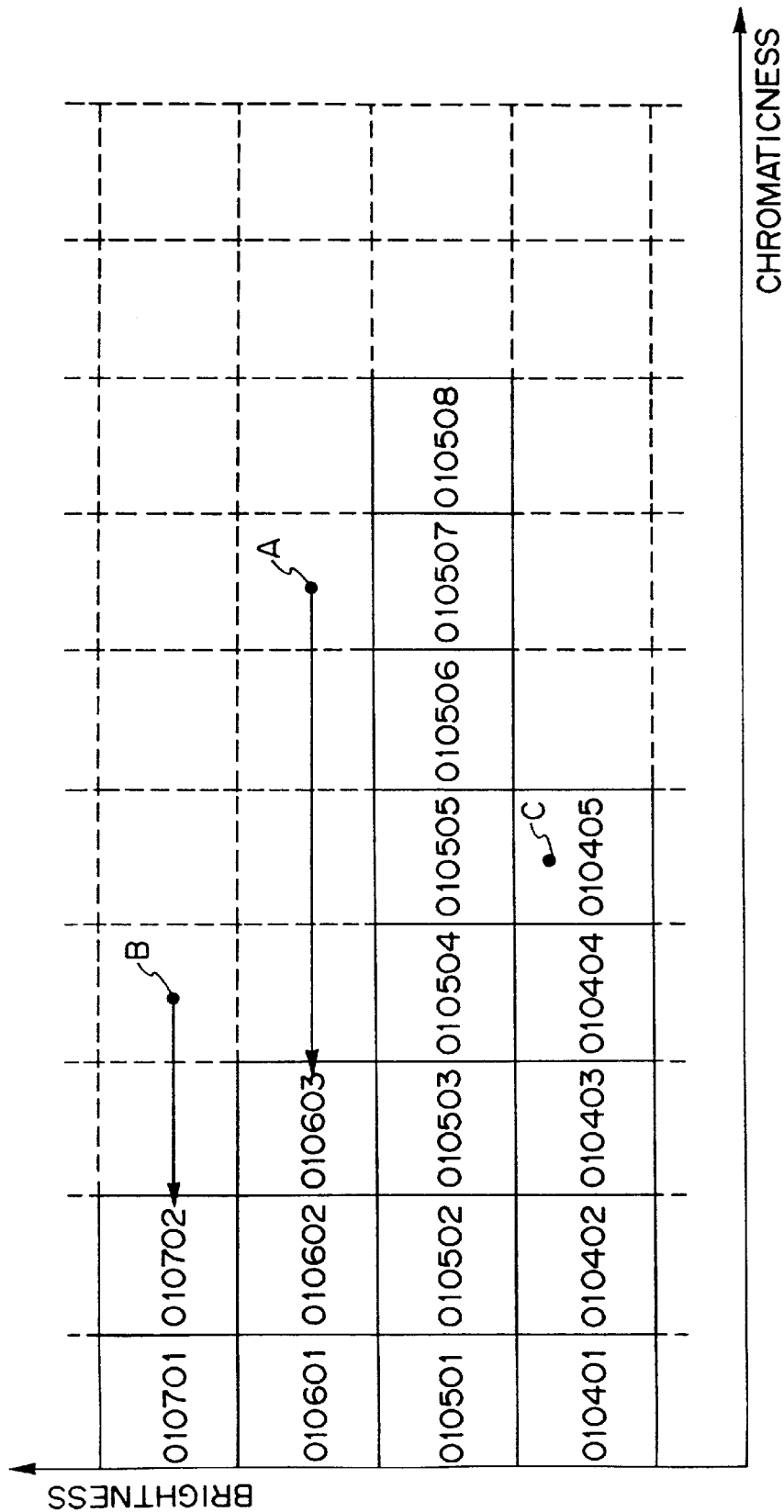
FIG. 26 illustrates a color conversion method according to another embodiment of the present invention.

According to this embodiment, the direction of conversion is changed according to the mode set in the conversion mode setting portion 706 being able to change manually the mode. In the conversion mode setting portion 706 has the following three kinds of modes:

Mode 1: the hue and the brightness of original information are held as it is and only the chromaticness is converted Mode 2: the hue and the chromaticness of original information are held as it is and only the brightness is changed Mode 3: the brightness and the chromaticness of original information are held as it is and only the hue is changed FIG. 26 is a cross sectional view of a certain hue (block code: 01XXX) similarly to FIG. 25. According to mode 1 according to this embodiment, color A is converted as color denoted by block "010603", while color B is converted as color denoted by block "010702". Since color C is denoted by block "010405", original information is maintained.

As can be clearly seen from a comparison made between the seventh embodiment (see FIG. 25) and this embodiment (see FIG. 26), the color is changed after the conversion even if the same color (color A or color B) by the setting of the conversion mode. The mode to be set for the conversion mode setting portion 706, of course, is not limited to the first and second embodiments. The number of kinds of the modes is not limited and a "no limit" mode may be provided when the mode setting is performed.

As described above, according to this embodiment, the specific block code for the output device (for example, a display, a printer or the like) after the conversion is stored in the color reproducible range block code memory 705. The color of original information within the specific color reproducible range for the device is accurately reproduced according to the performance of the device. Furthermore, colors deviated from the specific color reproducible range for the device can be converted into the outer periphery of the specific color reproducible range for the device to become the optimum color under a certain condition brought by the set conversion mode. Therefore, the color continuity can be maintained. Furthermore, by changing the set conversion mode, the direction of conversion can be changed.

Although the data format to be given to the color hard copy apparatus is Y, M, C and Bk (black) according to the above-described embodiments, the image data interface format for the color hard copy apparatus may, of course, be R, G and B. Furthermore, as for image data before the compression, the all color space region may, of course, be compressed as an alternative to that for a CRT.

According to the above-described embodiments, the image processing device comprises a scanner and a TV camera serving as image input means, a CRT and a color printer serving as image output means. The present invention is not limited to the above-described devices.

According to the above-described embodiments, all of portions to be color-space-compressed are subjected to a uniform compression performed in proportion to the distance from the central position of the color space by using the multiplier. However, the present invention is not limited to this. For example, an arrangement may be employed in which the color difference in the color space compression is varied in accordance with distance r from the central position. As an alternative to this, the degree of the compression may be varied in accordance with angle θ. Furthermore, since the all color space is changed depending upon Y, the brightness component Y may be arranged in such a manner that the degree of compression is varied.

The structure shown in FIG. 16 may be arranged in such a manner that the ratio of segment CE and segment CD is constant in the closed curve around point C and including point D. As an alternative to this, an arrangement may be employed in which segment CD is always constant and the closed curve including D is a circle around point C.

As described above, according to this embodiment, color information of color image data is converted into the uniform perception space so that a color coordinate system composed of the chromaticness and the hue is obtained. Furthermore, the characteristics of the color coordinate system that the color group having the same hue are positioned on the half line extending from the origin and the chromaticness is in proportion to the distance from the origin are utilized so that only chromaticness is substantially linearly or non-linearly color-compressed. Therefore, the brightness and the hue, which are very sensitive for human are not affected and the degree of visible image deterioration due to the color space compression can be prevented.

Therefore, according to this embodiment, the color reproducible region of a CRT or the like can be compressed and subjected to mapping within the color reproducing range of, for example, a color hard copy apparatus. Furthermore, by compressing only chromaticness while maintaining brightness information L* and hue component θ at the time of the color space compression, information which is very sensitive for the visibility of the eyes and the brain of a human can be maintained. Furthermore, only the chromaticness which cannot easily be sensed as the image quality deterioration is compressed so that the color space compression can be performed while maintaining a good image quality for the human.

Furthermore, according to this embodiment, a natural chromaticness gradation can be maintained while maintaining the chromaticness to the intermediate level and preventing the deterioration in the chromaticness.

As many apparently widely different embodiments of the present invention can be made without departing from the spirit and scope thereof, it is to be understood that this invention is not limited to the specific embodiments thereof except as defined in the appended claims.

What is claimed is:

1. A color image processing apparatus for transmitting color image data to an image forming apparatus, comprising:

hue correction table for storing coordinate information of color components on a non-linear hue line expressing the same hue components in a uniform color space;

color gamut mapping means for mapping color image data which lie outside of a color reproducible range of the image forming apparatus, along the non-linear hue line by using the coordinate information of said hue correction table; and first output means for outputting the color image data mapped by said color gamut mapping means to the image forming apparatus.

2. A color image processing apparatus according to claim 1, wherein said uniform color space is expressed by L*a*b*.

3. A color image processing apparatus according to claim 1, wherein said color gamut mapping means maps the color image data which lie outside of the color gamut of the image forming apparatus into the color reproducible range.

4. A color image processing method for transmitting color image data to an image forming apparatus, comprising the steps of:

mapping color image data which lie outside of a color reproducible range of the image forming apparatus, on a non-linear hue line expressed and constructed by the same hue component as the color image data in a uniform color space by using a table, wherein the table stores coordinate information of color components on the non-linear hue line expressing the same hue components in the uniform color space; and outputting the color image data mapped in said mapping step to the image forming apparatus.

5. A color image processing method, comprising the steps of:

inputting color image data; and performing color gamut mapping on the color image data;

wherein in said color gamut mapping step, hue and saturation of the color image data are converted with respect to a hue of the color image data based on a predefined non-linear locus corresponding to the hue, so that the color image data is mapped into a color gamut of an image output device.

6. A color image processing method according to claim 5, wherein the predefined non-linear locus represents the same hue in uniform color space.

7. A color image processing method according to claim 5, wherein in said color gamut mapping step, the color image data outside the color gamut of the image output device is mapped on a boundary of the color gamut.

8. A color image processing method according to claim 5, further comprising the step of:

outputting an image based on the color image data mapped in said color gamut mapping step.

9. A color image processing method, comprising the step of:

inputting color image data expressed by a plurality of components corresponding to a plurality of coordinates respectively;

selecting one of the plurality of coordinates in accordance with a manual operation; and mapping the color image data in a color gamut of an image output apparatus, in a condition in which a component of the color image data corresponding to the selected coordinate is fixed and other components of the color image data are converted.

10. A color image processing method according to claim 9, wherein said image data is expressed in a color uniform space and each of the plurality of components of color coordinates corresponds to brightness, hue and chromaticness, respectively.

11. A color image processing apparatus comprising:

input means for inputting color image data expressed by a plurality of components corresponding to a plurality of coordinates respectively;

selecting means for selecting one of said plurality of coordinates in accordance with a manual operation; and color gamut mapping means for mapping the color image data in a color gamut of an image outputting apparatus, in a condition in which a component of the color image data corresponding to the selected coordinate is fixed and other components of the color image data are converted.

12. A color image processing apparatus, comprising:

input means for inputting color image data; and color gamut mapping means for performing color gamut mapping on the color image data input by said input means;

wherein said color gamut mapping means modifies hue and saturation of the color image data with respect to a hue of the color image data, based on a predefined non-linear locus, so that the color image data is mapped into a color gamut of an image output device.

13. A color image processing apparatus for transmitting color image data to an image forming apparatus comprising:

color gamut mapping means for mapping color image data which lie outside of a color reproducible range of the image forming apparatus, along a non-linear hue line expressed and constructed by the same hue components of the color image data in a uniform color space; and first output means for outputting the color image data mapped by said color gamut mapping means to the image forming apparatus, wherein said color gamut mapping means converts the color image data which lie outside of the color gamut of the image forming apparatus, along an axis between maximum and minimum saturations of the same hue component of the color image data in the uniform color space, and after mapping the color image data along the axis, reconverts the mapped color image data along said non-linear hue line.

* * * * *

UNITED STATES PATENT AND TRADEMARK OFFICE
CERTIFICATE OF CORRECTION

PATENT NO.  : 5,933,252

DATED  : August 3, 1999

INVENTOR(S)  : Yasufumi Emori, et al.  Page 1 of 2

It is certified that error appears in the above-identified patent and that said Letters Patent is hereby corrected as shown below:

ON THE TITLE PAGE AT [57] ABSTRACT
  Line 6, "a" (first occurrence) should be deleted.

COLUMN 5
  Line 30, "now" should be deleted.

COLUMN 6
  Line 25, "range" should read --range:--.

COLUMN 8
  Line 23, "coordinater, θ." should read --coordinates r,θ--.

COLUMN 9
  Line 58, "designate" should read --designated--.

COLUMN 12
  Line 35, "understand" should read --understood--.

COLUMN 13
  Line 51, "$\tan^{-1}(i/q)(q\neq 0)$ or $\sin^{1}(i/(i^2+q^2)^{\frac{1}{2}})$", should read --$\tan^{-1}(i/q)(q\neq 0)$ or $\sin^{-1}(i/(i^2+q^2)^{\frac{1}{2}})$--;
  Line 57, "and" should read --as--.

COLUMN 14
  Line 58, "(r3, θ).by" should read --(r3, θ) by--.

COLUMN 17
  Line 25, "calculate" should read --calculates--.

UNITED STATES PATENT AND TRADEMARK OFFICE
CERTIFICATE OF CORRECTION

PATENT NO. : 5,933,252

DATED : August 3, 1999

INVENTOR(S) : Yasufumi Emori, et al.

It is certified that error appears in the above-identified patent and that said Letters Patent is hereby corrected as shown below:

<u>COLUMN 19</u>
  Line 5, "cross sectional" should read --cross-sectional--;
  Line 41, "cross sectional" should read --cross-sectional--.

<u>COLUMN 20</u>
  Line 43, "human" should read --humans--;
  Line 58, "human." should read --humans.--

Signed and Sealed this

Eighteenth Day of July, 2000

*Attest:*

Q. TODD DICKINSON

*Attesting Officer*     *Director of Patents and Trademarks*